(12) United States Patent
Sugita

(10) Patent No.: US 7,715,121 B2
(45) Date of Patent: May 11, 2010

(54) OPTICAL SYSTEM AND OPTICAL APPARATUS INCLUDING OPTICAL SYSTEM

(75) Inventor: Shigenobu Sugita, Shimotsuke (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/369,653

(22) Filed: Feb. 11, 2009

(65) Prior Publication Data

US 2009/0201590 A1    Aug. 13, 2009

(30) Foreign Application Priority Data

Feb. 12, 2008    (JP)    ............................. 2008-030299

(51) Int. Cl.
G02B 9/12    (2006.01)
G02B 9/00    (2006.01)

(52) U.S. Cl. .................... 359/784; 359/754; 369/112.23

(58) Field of Classification Search ......... 359/754–756, 359/761, 763, 770, 771, 784, 793; 369/112.01–112.29
See application file for complete search history.

(56) References Cited

U.S. PATENT DOCUMENTS

| 6,621,645 | B2 | 9/2003 | Sato |
| 6,687,061 | B2 | 2/2004 | Sensui |
| 6,791,765 | B2 | 9/2004 | Tsutsumi |
| 2006/0244939 | A1 | 11/2006 | Sugita |

FOREIGN PATENT DOCUMENTS

| JP | 2000-147373 | 5/2000 |
| JP | 2005-173275 | 6/2005 |
| JP | 2007-094174 | 4/2007 |
| JP | 07-178894 | 7/2007 |

*Primary Examiner*—Darryl J Collins
(74) *Attorney, Agent, or Firm*—Canon USA Inc IP Div.

(57) ABSTRACT

An optical system used for an image pickup apparatus including an image pickup element is provided. The optical system includes a negative lens disposed furthest away on the enlargement conjugation side and satisfies the following condition: 80 degrees<$2\omega$, where $2\omega$ (degrees) denotes an angle of view of the optical system. In addition, the following parameters of the optical system are optimally determined: a lens open angle $\theta$ of a surface of the negative lens on the reduction conjugation side, an index of refraction Ndn and an Abbe number vdn of a material of the negative lens for a d-line, and a relative partial dispersion $\theta gFn$ of the material of the negative lens for a g-line and an F-line.

13 Claims, 14 Drawing Sheets

FIG. 7A WIDE-ANGLE END

FIG. 7B TELEPHOTO END

FIG. 10A WIDE-ANGLE END
FIG. 10B TELEPHOTO END

OPTICAL SYSTEM AND OPTICAL APPARATUS INCLUDING OPTICAL SYSTEM

BACKGROUND OF THE INVENTION

1. Field of the Invention

The present invention relates to an optical system that is suitable for being applied to optical apparatuses, such as silver halide film cameras, digital still cameras, video cameras, digital video cameras, telescopes, binoculars, projectors, and copiers.

2. Description of the Related Art

It is required that an optical system used for optical apparatuses, such as digital cameras, video cameras, and projectors, is wide-angled, and a high-quality image (a high-quality projected image for a projector) without distortion is obtained.

Wide-angle lenses are suitable for obtaining a natural image without distortion in a wide range on an object side. Normal projection wide-angle lenses satisfy a condition: $Y'=f \cdot \tan \omega$, where $Y'$ denotes the image height, f denotes the focal length of the wide-angle lens (an optical system), and $2\omega$ denotes the entire angle of view (an angle subtended by an object).

In order to effectively obtain a wide angle, normal wide-angle lenses include a negative lens or negative lens unit having a high negative power (refractive power) disposed on an enlargement conjugation side. At that time, in order to obtain further wide-angle lens system, the negative power of the negative lens needs to be increased.

In general, as the power of a negative lens is increased, more negative distortion (distortion aberration) occurs. More distortion of an image occurs in the peripheral portions of the screen, and therefore, it is difficult to maintain the condition: $Y'=f \cdot \tan \omega$.

Accordingly, it is desirable that a negative meniscus lens GN having a convex surface on the enlargement conjugation side is disposed furthest away on the enlargement conjugation side. This arrangement allows marginal rays (light rays having marginal angles) to be made incident at an angle close to the normal to each surface portion. Accordingly, the occurrence of distortion can be easily prevented.

An example of a wide-angle optical system having such an arrangement is described in U.S. Pat. No. 6,791,765.

In general, as the angle of view increases, the lens open angle of the negative lens GN tends to increase.

Japanese Patent Laid-Open No. 2007-094174 and Japanese Patent Laid-Open No. 2005-173275 describe a super wide-angle lens having an entire view angle ($2\omega 80°$) and including the negative lens GN having a significantly large lens open angle.

As the open angle of the lens is increased so that the shape of the lens becomes closer to being hemispherical ($\theta=90°$), the dimensional accuracy of a polished surface is decreased. In addition, an anti-reflection evaporated film is not uniformly applied to the peripheral portions of the surface. Consequently, the performance of the film is significantly decreased, and therefore, ghost may occur.

In contrast, a wide-angle optical system is proposed in which an aspherical surface is disposed in the vicinity of a negative lens disposed furthest away on the enlargement conjugation side so that the distortion is sufficiently corrected and the open angle of the negative lens is slightly decreased for a wide-angle lens (refer to, for example, U.S. Pat. No. 6,621,645 or U.S. Pat. No. 6,687,061).

As the angle of view of an optical system is increased, the open angle of the surface of a negative lens on the reduction conjugation side disposed furthest away on the enlargement conjugation side is increased. At that time, if the open angle of the surface of a negative lens on the reduction conjugation side is decreased, chromatic aberration of magnification in a short wavelength range significantly occurs.

For example, in general, a wide-angle lens obtains a viewing angle by using a negative lens disposed furthest away on the enlargement conjugation side (a first negative lens). In addition, the wide-angle lens uses a material having a high refractive index and a low dispersion for the negative lens in order to prevent overcorrection of first-order chromatic aberration of magnification due to the high negative power (refractive power).

Nowadays, many optical materials having high refractive index and a low dispersion have second-order dispersion (dispersion in a short wavelength range).

For this reason, if the open angle of the surface of the negative lens on the reduction conjugation side is slightly decreased for the wide angle of view, the refractive power of the surface of the negative lens on the enlargement conjugation side is increased. Accordingly, chromatic aberration of magnification in a short wavelength range significantly occurs on the surface on the enlargement conjugation side.

As a result, for wide-angle lenses having a viewing angle 80 degrees or more, it is significantly difficult to correct chromatic aberration of magnification over a wide wavelength range while decreasing the open angle of a surface of a negative lens on the reduction conjugation side.

Therefore, for existing wide-angle lenses, it is required to sufficiently correct distortion and chromatic aberration of magnification in a short wavelength range while decreasing the open angle of the surface of a negative lens on the reduction conjugation side disposed furthest away on the enlargement conjugation side.

SUMMARY OF THE INVENTION

The present invention provides a wide-angle optical system for sufficiently reducing distortion and chromatic aberration of magnification in a visible light range. The present invention further provides an optical system including a negative lens having an open angle (a lens open angle) of a surface thereof on a reduction conjugation side disposed furthest away on the enlargement conjugation side.

According to an embodiment of the present invention, an optical system mountable to an image pickup apparatus including an image pickup element is provided. The optical system includes a negative lens disposed furthest away on the enlargement conjugation side. The following condition is satisfied:

$$80 \text{ degrees} < 2\omega,$$

where $2\omega$ (degrees) denotes an angle of view of the optical system, and the following conditions are satisfied:

$$0.25 < \tan \theta / \tan \theta < 1.5,$$

$$Ndn > 1.65, \text{ and}$$

$$\theta gFn - (0.6438 - 0.001682 \times vdn) > 0.0010,$$

where $\theta$ denotes a lens open angle of a surface of the negative lens on the reduction conjugation side, Ndn and vdn denote the index of refraction and Abbe number of a material of the negative lens for a d-line, respectively, and $\theta gFn$ denotes a relative partial dispersion of the material of the negative lens for a g-line and an F-line.

Further features of the present invention will become apparent from the following description of exemplary embodiments with reference to the attached drawings.

DESCRIPTION OF THE EMBODIMENTS

An optical system (a retrofocus wide-angle lens or a wide-angle zoom lens) and an optical apparatus (mainly an image pickup apparatus) including the optical system according to exemplary embodiments of the present invention are described below.

According to the present invention, the optical system includes a retrofocus wide-angle lens or a wide-angle zoom lens used for an image pickup apparatus including an image pickup element (a conjugation surface on a reduction side). The wide-angle zoom lens or the wide-angle lens may form an optical system integrated into an image pickup apparatus or a removable optical system (i.e., an interchangeable lens) of the image pickup apparatus. When the optical system serves as a zoom lens, the entire system serves as a retrofocus system at a wide-angle end.

The optical system includes a negative lens disposed furthest away on the enlargement conjugation side. In addition, when the entire field angle of the optical system is 2ω (degrees) (the entire field angle at a wide-angle end if the optical system serves as a zoom lens), the following condition is satisfied:

80 degrees<2ω.

As used herein, the terms "enlargement conjugation side" and "reduction conjugation side" refer to an object (photographic subject) side and an image pickup element side (or a film side) for a photo-taking lens, respectively. For a projection lens of a liquid crystal projector, the terms "enlargement conjugation side" and "reduction conjugation side" refer to a screen side (projection surface) side and a liquid crystal panel side, respectively.

Figure 1:
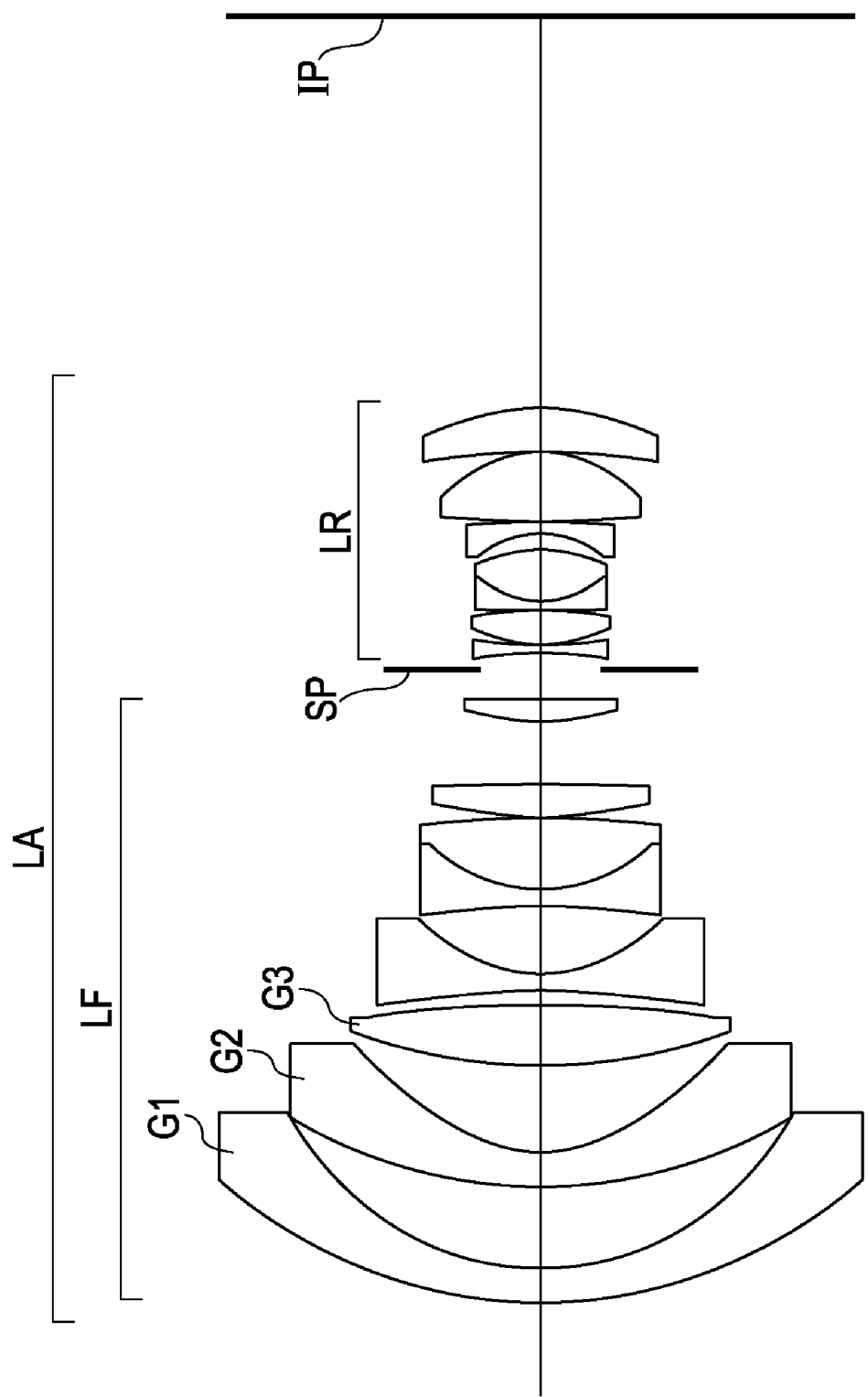
FIG. 1 is a cross-sectional view of an optical system according to a first embodiment of the present invention.
Figure 2:
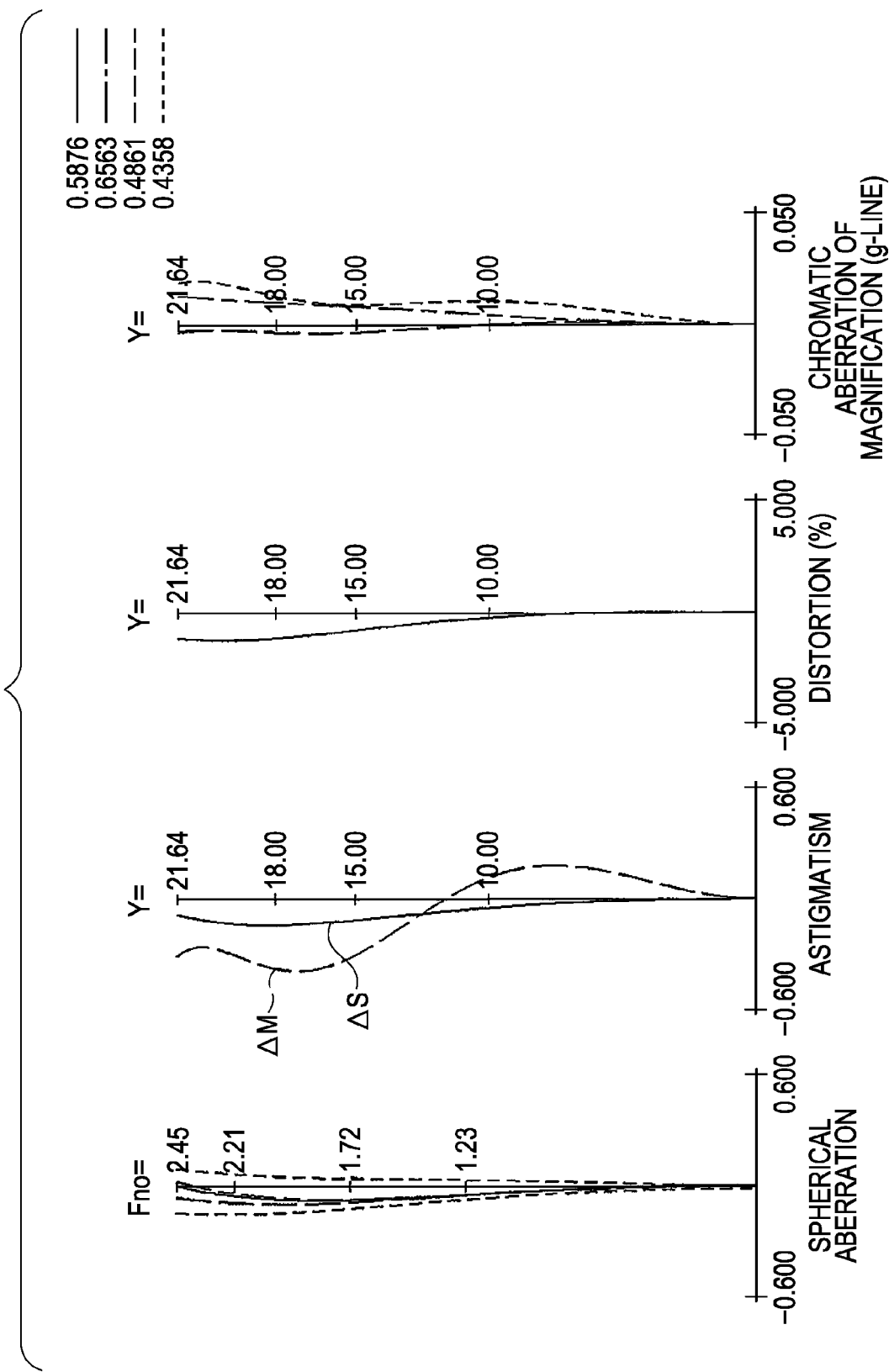
FIG. 2 is an aberration graph of an optical system according to a first numerical embodiment when an object is at an infinite distance, where the values with no unit specified default to millimeters.

FIG. 1 is a cross-sectional view of a wide-angle lens when an optical system according to a first embodiment of the present invention serves as the wide-angle lens. FIG. 2 is an aberration diagram when an object is at infinity, according to the first embodiment.

Figure 3:
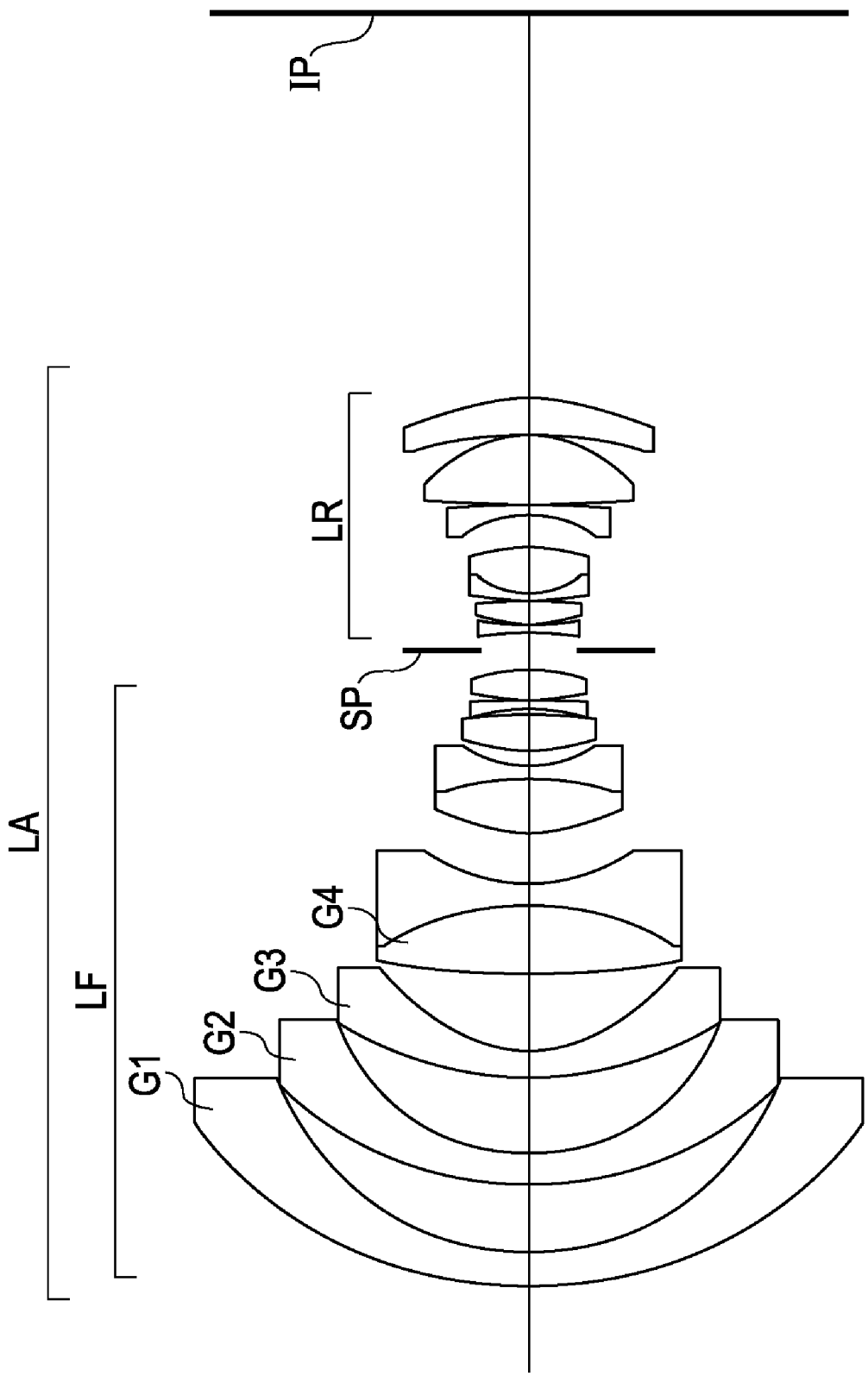
FIG. 3 is a cross-sectional view of an optical system according to a second embodiment of the present invention.
Figure 4:
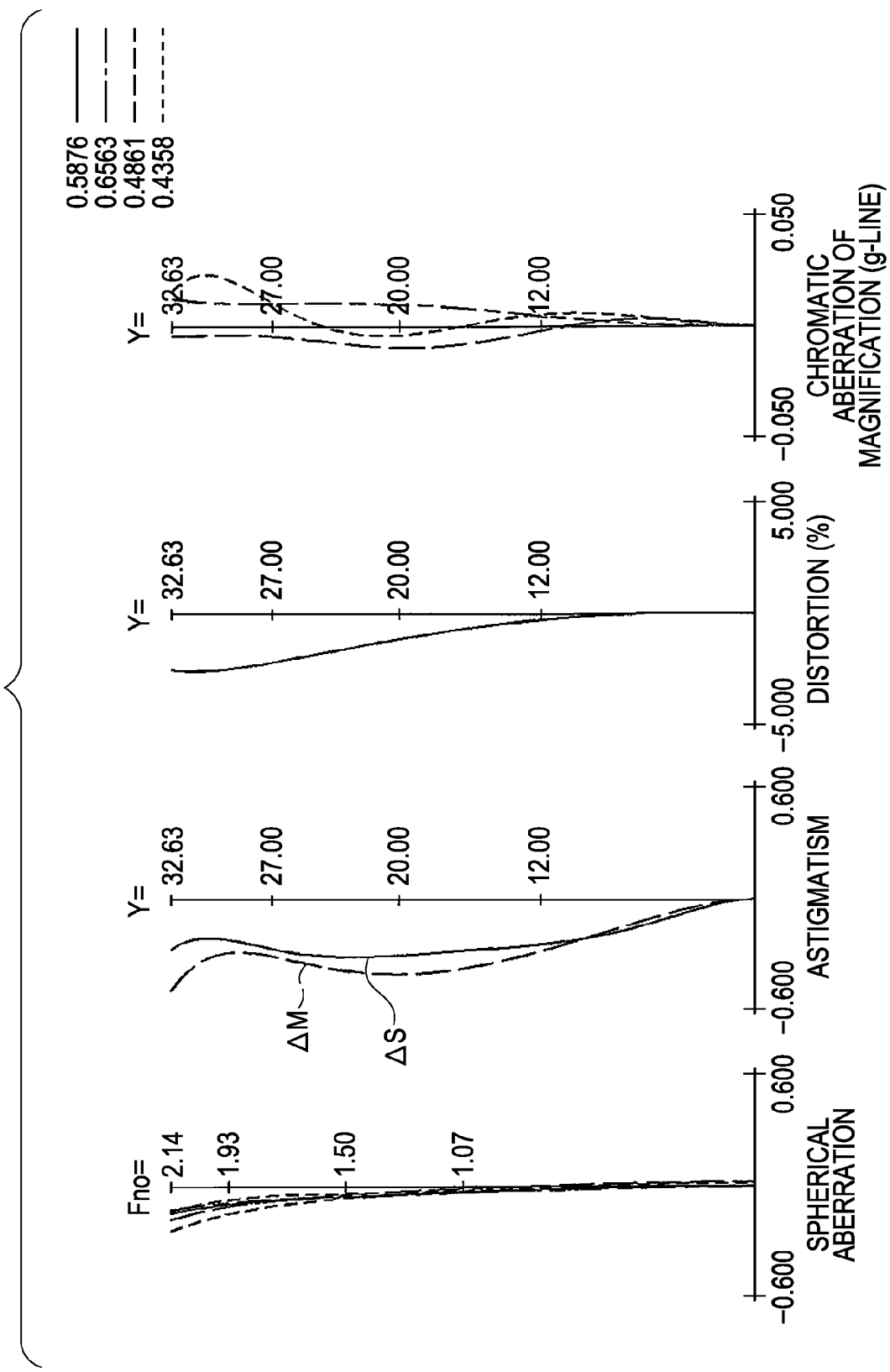
FIG. 4 is an aberration graph of an optical system according to a second numerical embodiment when an object is at an infinite distance, where the values with no unit specified default to millimeters.

FIG. 3 is a cross-sectional view of a wide-angle lens when an optical system according to a second embodiment of the present invention serves as the wide-angle lens. FIG. 4 is an aberration diagram when an object is at infinity, according to the second embodiment.

Figure 5:
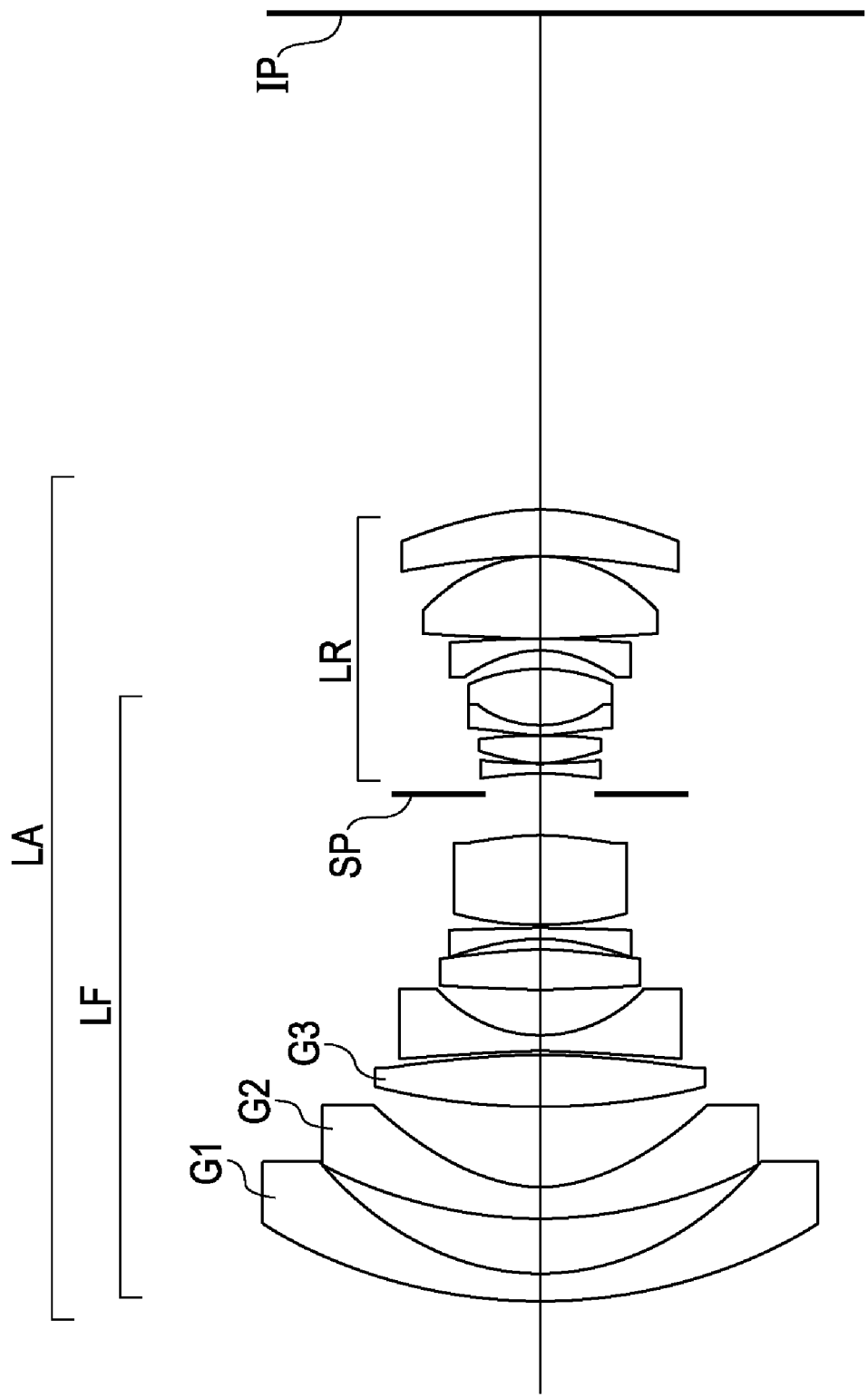
FIG. 5 is a cross-sectional view of an optical system according to a third embodiment of the present invention.
Figure 6:
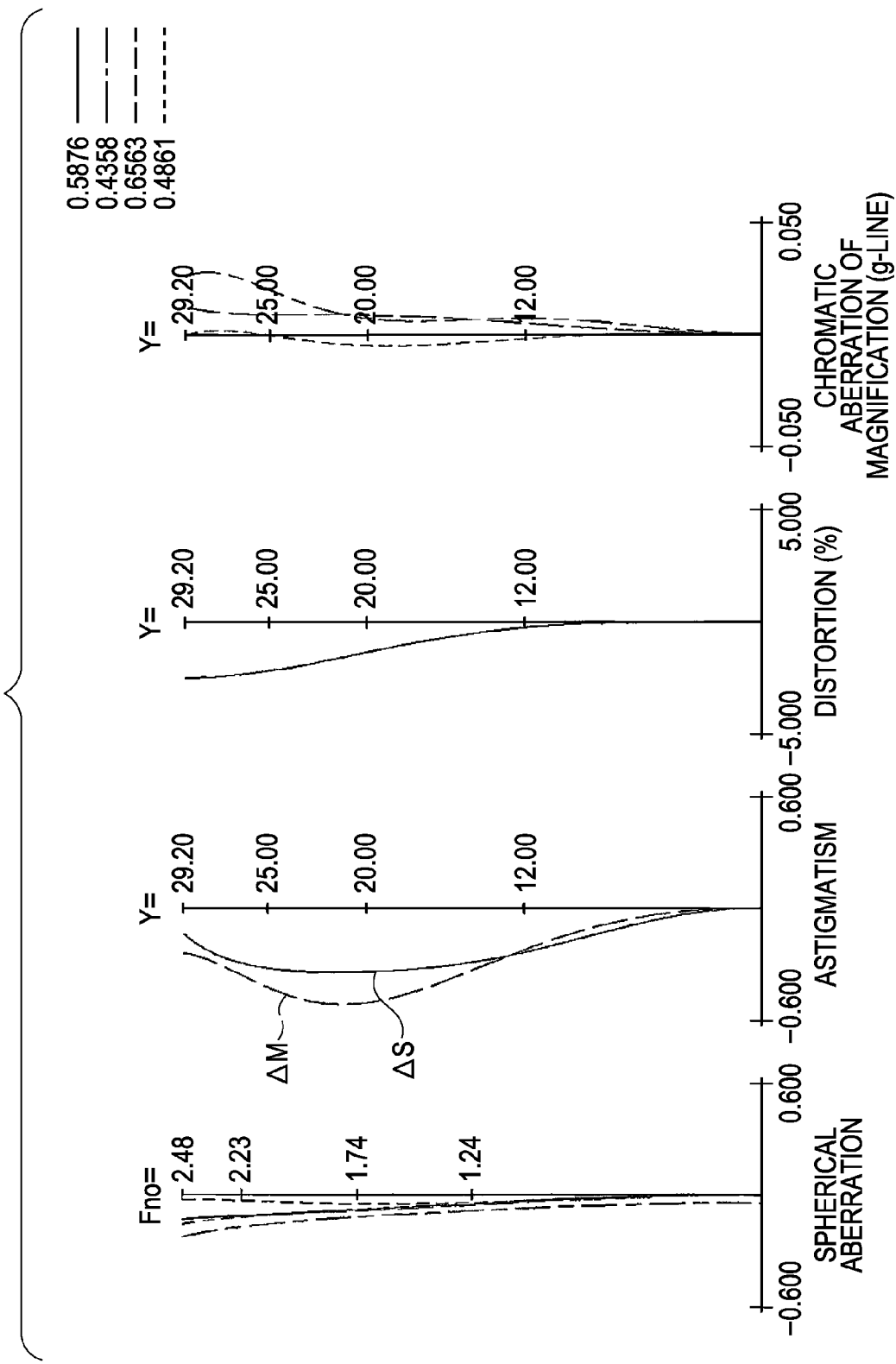
FIG. 6 is an aberration graph of an optical system according to a third numerical embodiment when an object is at an infinite distance, where the values with no unit specified default to millimeters.

FIG. 5 is a cross-sectional view of a wide-angle lens when an optical system according to a third embodiment of the present invention serves as the wide-angle lens. FIG. 6 is an aberration diagram when an object is at infinity, according to the third embodiment.

Figure 7:
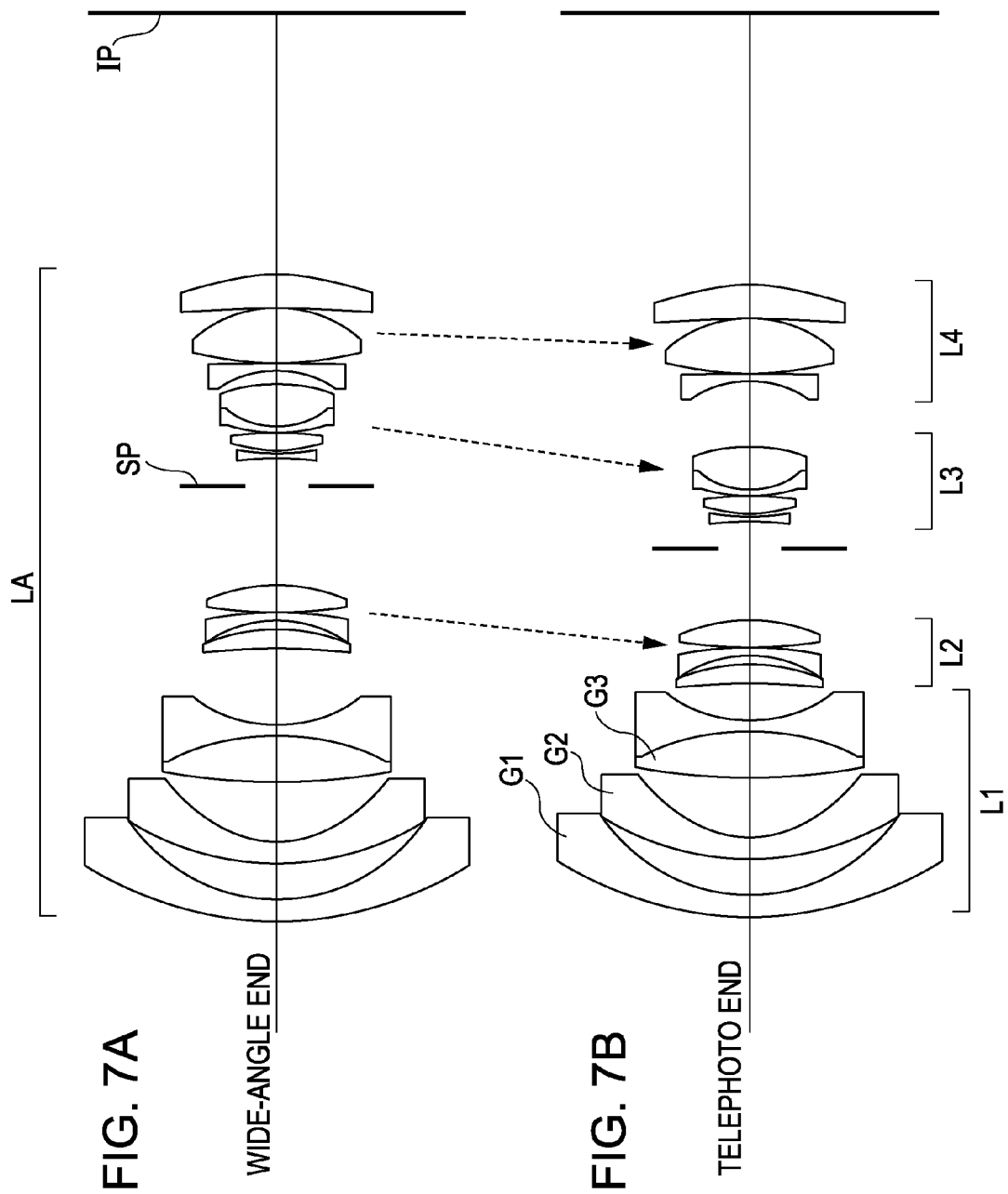
FIGS. 7A and 7B are cross-sectional views of an optical system (a zoom lens) according to a fourth embodiment of the present invention.

FIGS. 7A and 7B are cross-sectional views of lenses at a wide-angle end (at a short focal length end) and a telephoto end (at a long focal length end), respectively, when an optical system according to a fourth embodiment of the present invention serves as a zoom lens.

Figure 8:
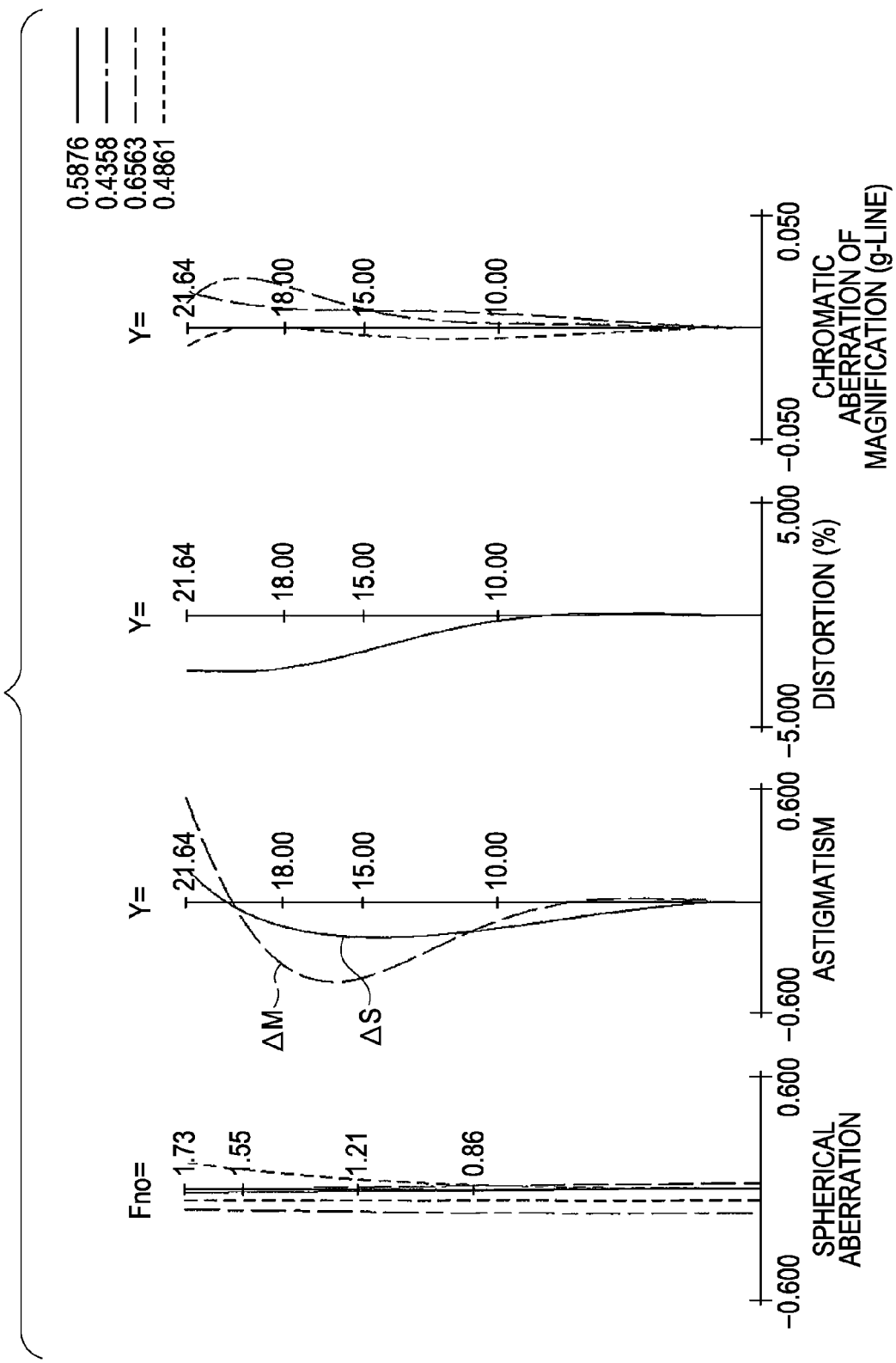
FIG. 8 is an aberration graph at a wide-angle end of an optical system according to a fourth numerical embodiment when an object is at an infinite distance, where the values with no unit specified default to millimeters.
Figure 9:
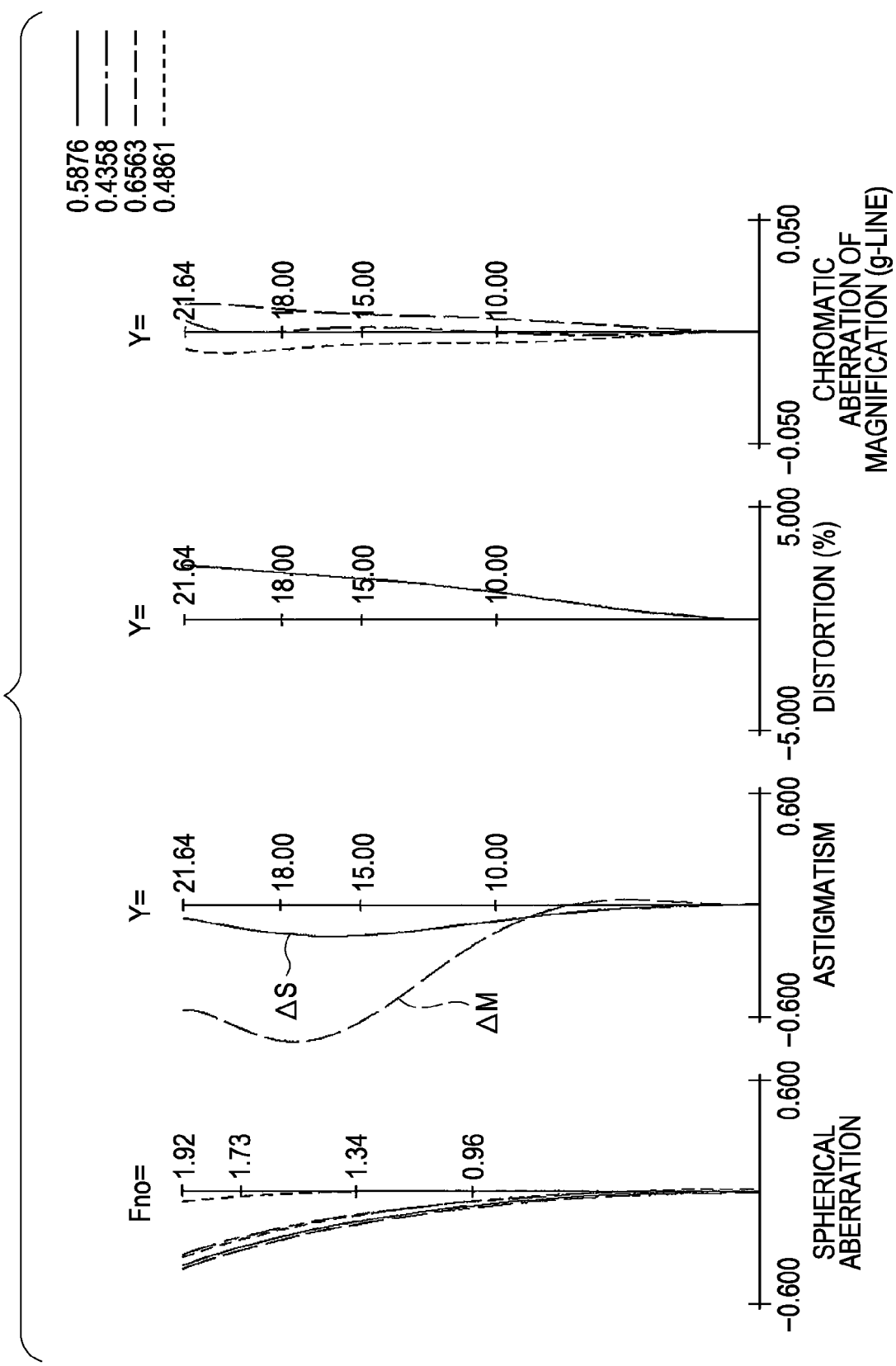
FIG. 9 is an aberration graph at a telephoto end of an optical system according to the fourth numerical embodiment when an object is at an infinite distance.

FIGS. 8 and 9 are aberration diagrams at a wide-angle end and a telephoto end of the zoom lens according to the fourth embodiment, respectively, when an object is at infinity.

Figure 10:
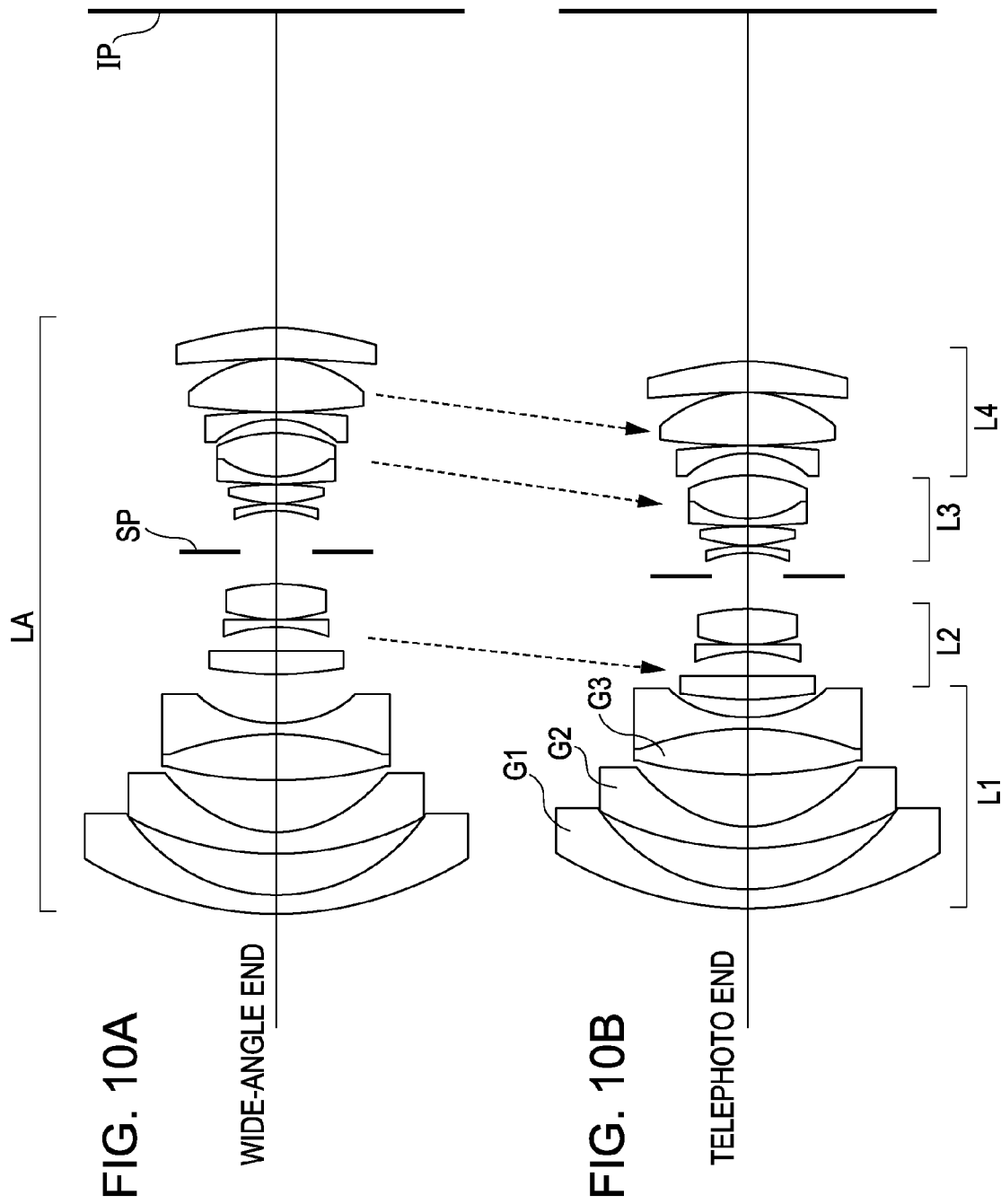
FIGS. 10A and 10B are cross-sectional views of an optical system (a zoom lens) according to a fifth embodiment of the present invention.

FIGS. 10A and 10B are cross-sectional views of an optical system according to a fifth embodiment at a wide-angle end and a telephoto end, respectively, when the optical system serves as a zoom lens.

Figure 11:
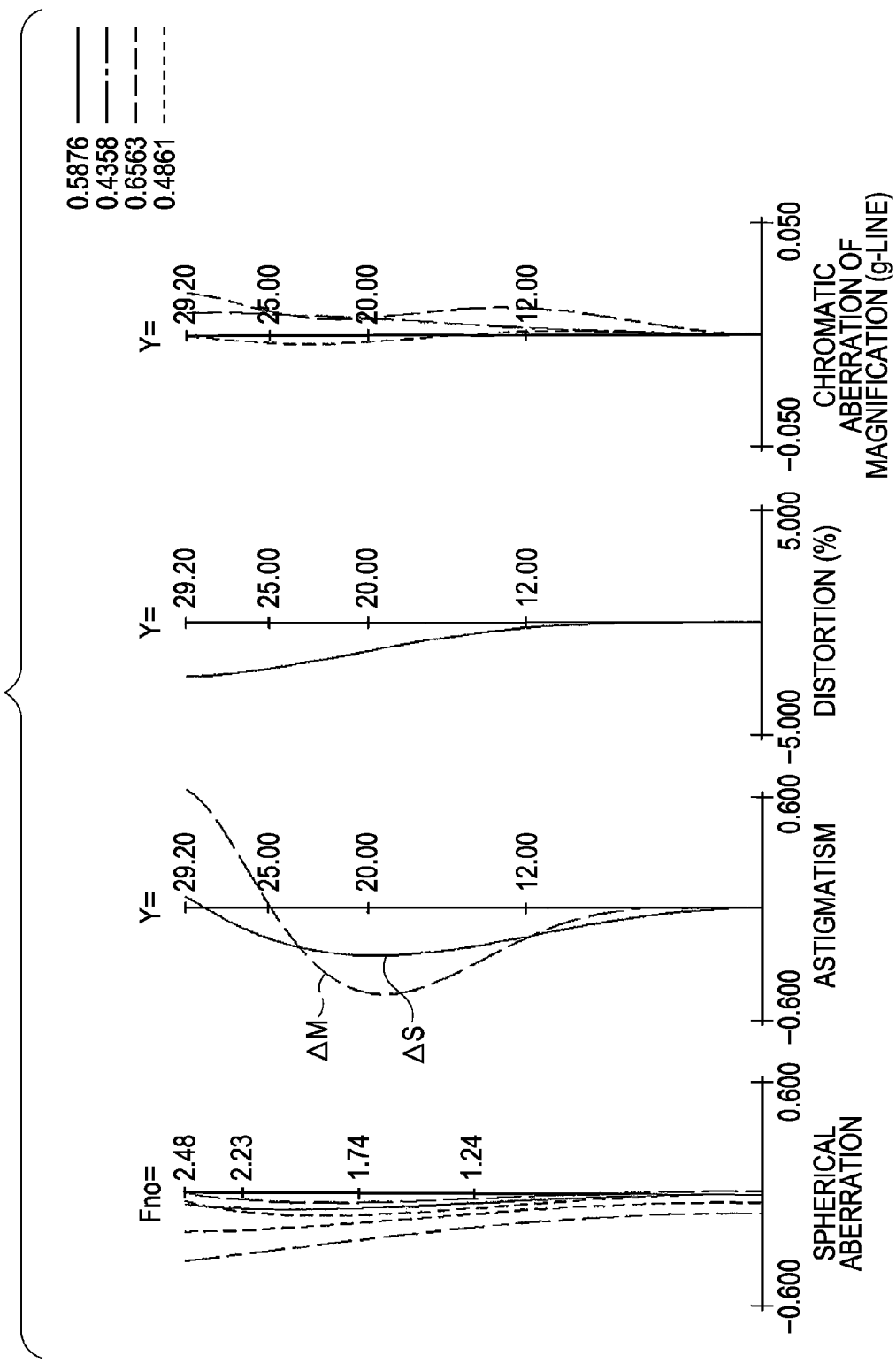
FIG. 11 is an aberration graph at a wide-angle end of an optical system according to a fifth numerical embodiment when an object is at an infinite distance.
Figure 12:
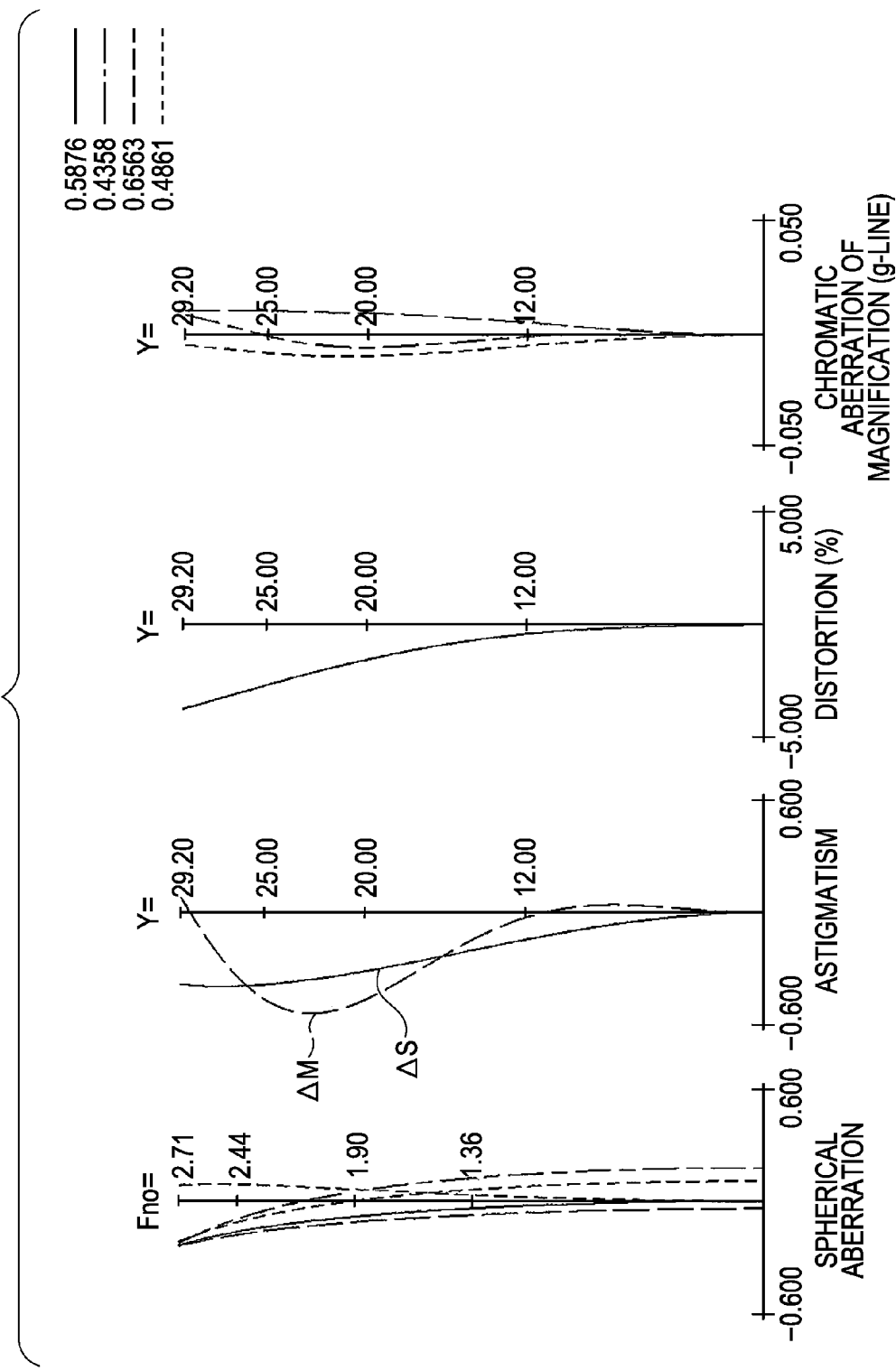
FIG. 12 is an aberration graph at a telephoto end of the optical system according to the fifth numerical embodiment when an object is at an infinite distance.

FIGS. 11 and 12 are aberration diagrams at a wide-angle end and a telephoto end of the zoom lens according to the fifth embodiment, respectively, when an object is at infinity.

Figure 13:
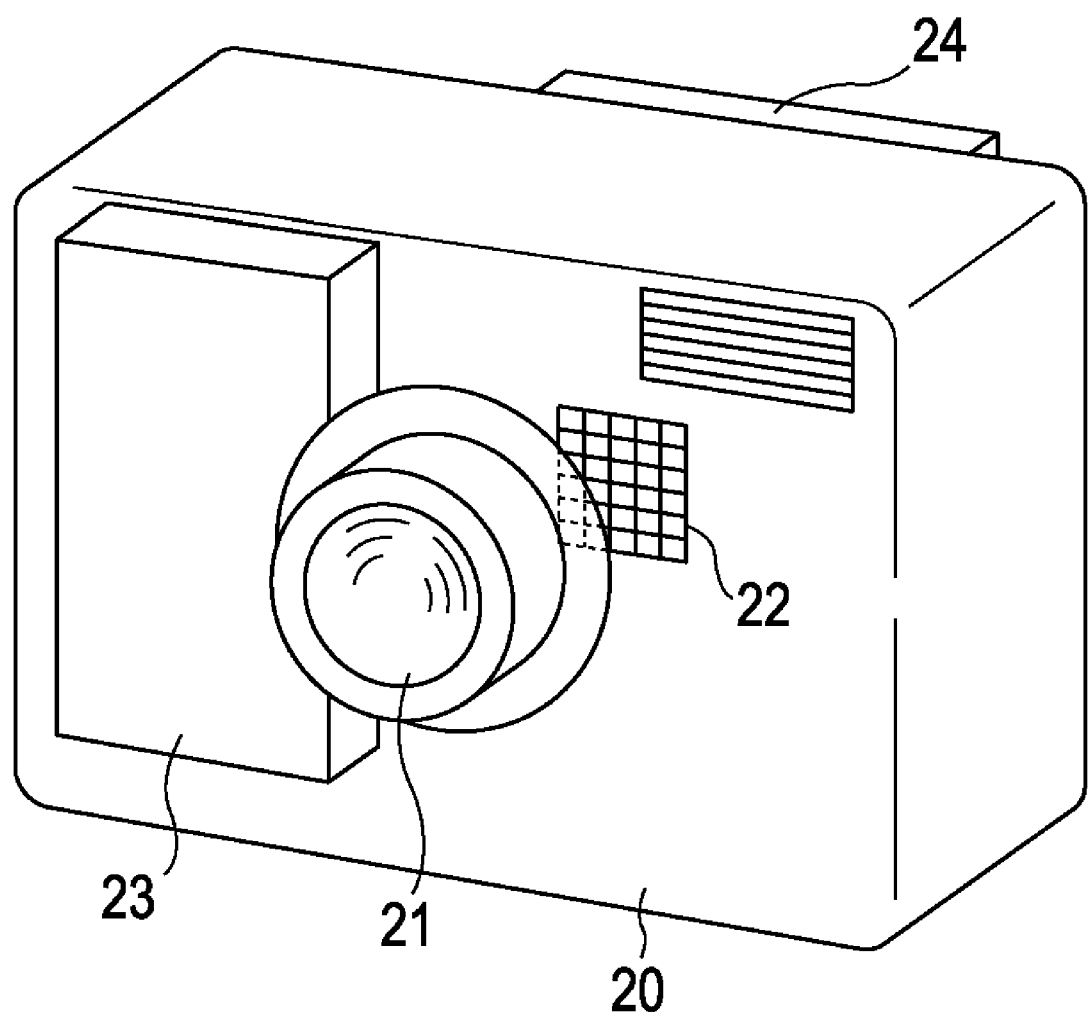
FIG. 13 is a schematic illustration of a main portion of an optical apparatus according to an embodiment of the present invention.

FIG. 13 is a schematic illustration of a main portion of a digital camera (an optical apparatus) including the optical system according to the present invention.

Note that the optical systems according to the embodiments serve as an image-capturing lens system used for optical apparatuses, such as digital cameras and video cameras. In the cross-sectional views of the optical systems, the left indicates an enlargement conjugation side (an object side) (a front side), while the right indicates a reduction conjugation side (a rear side).

When the optical system is used for a projector, the left side indicates a screen side, while the right side indicates a projected image side. In the cross-sectional views of the lenses, "LA" denotes the optical system.

The optical systems illustrated in FIGS. 1, 3, and 5 serve as fixed focal length wide-angle lenses. In FIGS. 1, 3, and 5, a front lens unit LF has a negative refractive power. "SP" denotes an aperture stop. A rear lens unit LR has a positive refractive power.

The optical systems illustrated in FIGS. 7A, 7B, 10A, and 10B serve as wide-angle zoom lenses. In the zoom lens LA illustrated in FIGS. 7A, 7B, 10A, and 10B, a first lens unit L1 has a negative refractive power (optical power=inverse of a focal length). A second lens unit L2 has a positive refractive power. "SP" denotes an aperture stop. A third lens unit L3 has a positive refractive power. A fourth lens unit L4 has a positive refractive power.

When zooming is performed (during zooming) from a wide-angle end to a telephoto end, the second lens unit L2, the third lens unit L3, and the fourth lens unit L4 are moved as indicated by arrows.

An image plane IP is illustrated in the drawings. When the zoom lens is used for an imaging optical system of video cameras or digital still cameras, the image plane IP serves as an imaging surface of a solid-state image pickup element (a photoelectric conversion element), such as a charged coupled device (CCD) sensor or a complementary metal oxide semiconductor (CMOS) sensor. In contrast, when the zoom lens is used for an imaging optical system of silver-halide film cameras, the image plane IP corresponds to a film surface. Lenses G1 to G5 are disposed from the object side in this order.

The aberration graphs in each of the drawings correspond to a spherical aberration (Sph) graph, an astigmatism (As) graph, a distortion (Dst) graph, and a chromatic aberration of magnification (Chro) graph from the left.

In the aberration graphs of spherical aberration and chromatic aberration of magnification, the solid line indicates d-line (587.6 nm), the alternate long and short dash line indicates C-line (656.3 nm), the long-dotted line indicates F-line (486.1 nm), and the short-dotted line indicates g-line (435.8 nm).

In the aberration graphs of astigmatism, the solid line indicates a sagittal direction $\Delta S$ of the d-line. The dotted line indicates meridional direction $\Delta M$ of the d-line.

The graph of distortion represents distortion of the d-line. "Fno" denotes the F number. "Y" denotes the image height.

According to the embodiments of the present invention, each of the optical systems LA includes a negative lens Gn disposed furthest away on the enlargement conjugation side. In the embodiments of the present invention, this negative lens Gn corresponds to the lens G1.

Let $\theta$ denote a lens open angle of the surface of the negative lens Gn on the reduction conjugation side. Let Ndn and $\nu$dn denote the index of refraction and Abbe number of the material of the negative lens Gn for the d-line, respectively. Let $\theta$gFn denote the relative partial dispersion of the material of the negative lens Gn for the g-line and the F-line. Then, the following conditions are satisfied:

$$0.25 < \tan\theta/\tan\theta < 1.50 \tag{1},$$

$$Ndn > 1.65 \tag{2), and}$$

$$\theta gFn - (0.6438 - 0.001682 \times \nu dn) > 0.0010 \tag{3}.$$

In this example, Abbe number and the relative partial dispersion of the material (optical material) used are as follows.

Let Ng, NF, Nd, and Nc denote the indices of refraction for the g-line (wavelength=435.8 nm), the F-line (wavelength=486.1 nm), the d-line (wavelength=587.6 nm), and the C-line (wavelength=656.3 nm), respectively. At that time, as widely recognized, the definitions of an Abbe number $\nu$d and a relative partial dispersion $\theta$gF are as follows:

$$\nu d = (Nd - 1)/(NF - Nc), \text{ and}$$

$$\theta gF = (Ng - NF)/(NF - Nc).$$

Note that a half angle of view $\omega$ satisfies the following condition:

$$Y' = f \cdot \tan\omega$$

where f denotes the focal length of the optical system, and Y' denotes an image height.

Figure 14A:
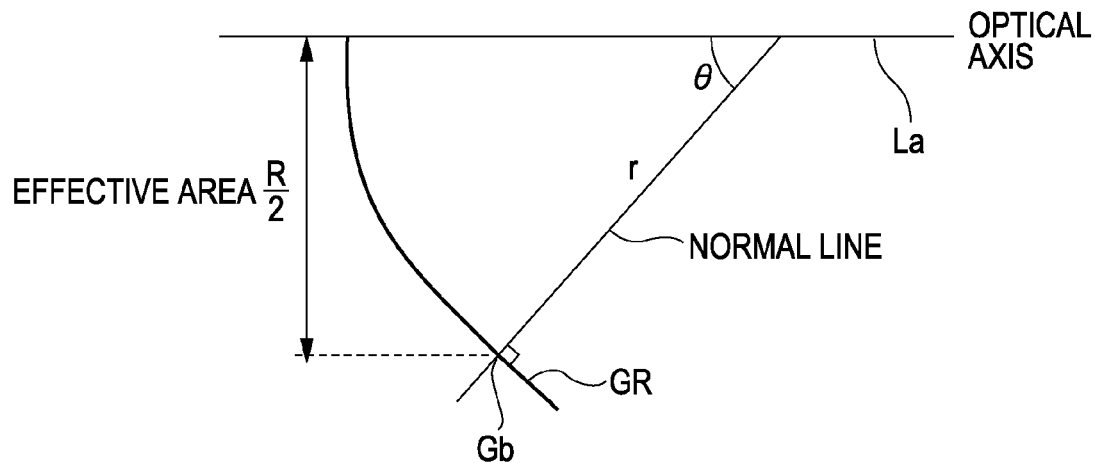
FIGS. 14A and 14B illustrate a lens open angle according to an embodiment of the present invention.
Figure 14B:
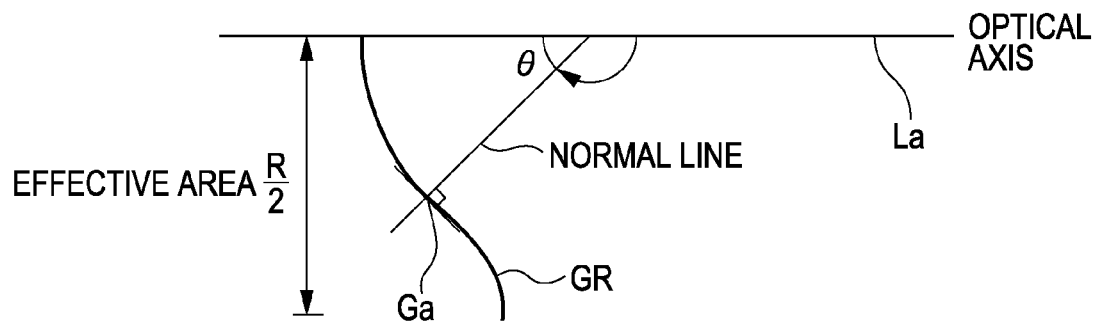

The definition of the lens open angle (the open angle) $\theta$ is illustrated in FIGS. 14A and 14B. That is, FIGS. 14A and 14B illustrate the definition of the lens open angle.

FIG. 14A illustrates the definition of the lens open angle $\theta$ when the lens surface GR is spherical. Let R denote an effective diameter of a lens surface GR, and let r denote the radius of curvature of the lens surface GR. Then, the lens open angle $\theta$ is an angle formed by a surface normal to the end surface portion Gb in an effective area of the lens surface GR and an optical axis La. That is, the open angle is expressed as follows:

$$\theta = \sin^{-}-(R/2r).$$

FIG. 14B illustrates the definition of the lens open angle $\theta$ when the lens surface GR is aspherical. In this case, the lens open angle $\theta$ is defined as a maximum angle $\theta$max among angles formed by a surface normal to any surface portion Ga of the effective area of the lens surface GR and the optical axis La.

As the lens open angle increases, the radius of curvature of the lens surface GR becomes smaller.

In the embodiments of the present invention, when a lens having a sufficiently low power (a lens having a focal length greater than or equal to 50 times the focal length of the entire lens system) is disposed furthest away on the enlargement conjugation side, this lens has negligible effect on the aberrations of the lens system. Accordingly, when a lens having a sufficiently low power is located on the enlargement conjugation side, influence due to the presence of the lens is negligible, and therefore, a lens located so as to be closer to the reduction conjugation side than the lens having a sufficiently low power is regarded as a lens located furthest away on the enlargement conjugation side.

In order to minimize the occurrence of distortion, the negative lens Gn has a meniscus shape having a convex surface on the enlargement conjugation side. This shape transmits the marginal rays in directions normal to surface portions.

By satisfying conditional expression (1), the negative lens Gn can have a lens open angle sufficiently reduced with respect to the angle of view.

At that time, it is more desirable that the range defined by conditional expression (1) is changed to:

$$0.75 < \tan\theta/\tan\theta < 1.20 \tag{1a}$$

By satisfying conditional expression (2), the negative lens Gn can effectively have a power to provide a wide angle of view while reducing the lens open angle.

At that time, it is more desirable that the range defined by conditional expression (2) is changed to:

$$2.10 > Ndn > 1.75 \tag{2a}$$

In particular, if Ndn exceeds the upper limit value defined in conditional expression (2a), the remaining amount of distortion increases. Accordingly, a value exceeding the upper limit value is not desirable.

By using a material having a large second-order dispersion that satisfies conditional expression (3) for the negative lens Gn, the chromatic aberration of magnification occurring in a short wavelength range can be effectively corrected.

At that time, it is more desirable that the range defined by conditional expression (3) is changed to:

$$0.0500 > \theta gFn - (0.6438 - 0.001682 \times vdn) > 0.010 \quad (3a)$$

If the value exceeds the upper limit value defined by conditional expression (3a), the chromatic aberration of magnification is overcorrected. Accordingly, a value exceeding the upper limit value is not desirable.

By satisfying the above-described conditional expressions, the lens open angle of the surface of the negative lens Gn on the reduction conjugation side can be sufficiently reduced while sufficiently correcting the chromatic aberration of magnification.

If the negative lens Gn exceeds the upper limit value defined by conditional expression (1), the lens open angle becomes too large. Accordingly, the dimensional accuracy of a polished surface is disadvantageously decreased. In addition, the uniformity of anti-reflection film is disadvantageously decreased.

Furthermore, if the negative lens Gn exceeds the lower limit value defined by conditional expression (1), the angle between the marginal ray and the normal to the surface becomes too large, and therefore, the distortion and first-order chromatic aberration of magnification are overcorrected.

If the negative lens Gn exceeds the lower limit value defined by conditional expression (2), the power of the negative lens Gn is not sufficient, and therefore, it is difficult to effectively obtain a wide angle of view.

In addition, it is desirable that Ndn in conditional expression (2) is less than 2.00, and more desirably, 1.92, and still more desirably 1.85.

If the value defined in conditional expression (3) falls below the lower limit, the chromatic aberration of magnification in a short wavelength range is undercorrected. Accordingly, color blur occurs, and therefore, the quality of an image is decreased.

In addition, it is desirable that the value defined in conditional expression (3) is less than 0.30, and more desirably, 0.10, and still more desirably 0.025.

More desirable conditions using additional components are described below. These conditions are not always necessary. However, if the following conditions are satisfied, a wide-angle lens or a wide-angle zoom lens having more desirable performance can be achieved.

Let L denote the total lens length (entire length of a lens, total length of a lens, or total length of the optical system). At that time, the zoom lens includes at least one aspherical surface. Then, it is desirable that a distance between the aspherical surface (one of the aspherical surfaces) and a surface (a lens surface, a refractive surface, a diffractive surface, or a reflecting surface having a curvature) nearest to the enlargement conjugation side in the zoom lens is less than or equal to 0.3 L.

As used herein, the term "entire length of a lens (entire length of the optical system, zoom lens) L" refers to a distance between a lens disposed nearest to the enlargement conjugation side (a first lens surface) and a lens disposed nearest to the reduction conjugation side (a final lens surface) in the zoom lens. When the optical system serves as a zoom lens, the term "entire length of a lens L" refers to the distance between a first lens surface at a wide-angle end (a lens surface located nearest to the enlargement conjugation side or the surface at one end of the optical system) to a final lens surface (a lens surface located nearest to the reduction conjugation side or the surface at the other end of the optical system).

This arrangement can effectively correct distortion, sufficiently maintain the condition: Y'=f·tan ω, and sufficiently reduce the lens open angle of the negative lens Gn.

Here, a position within the distance of 0.3 L from a surface located furthest away on the enlargement conjugation side in a direction towards the reduction conjugation side is a position at which the incidence height of a pupil paraxial ray $\bar{h}$ is high. Accordingly, distortion occurring when the lens open angle of the negative lens Gn disposed furthest away on the enlargement conjugation side is reduced can be easily corrected by using the aspherical surface.

If the position of the aspherical surface is outside the distance of 0.3 L, the incidence height of a pupil paraxial ray $\bar{h}$ is not sufficiently high, and therefore, it is difficult to sufficiently correct the distortion.

In addition, in the embodiments of the present invention, it is desirable that at least a surface of a positive lens Gp on the enlargement conjugation side is disposed within a distance of 0.4 L from a surface located furthest away on the enlargement conjugation side in a direction towards the reduction conjugation side, and the material of the positive lens Gp satisfies the following condition:

$$vdp < 45 \quad (4)$$

where vdp denotes Abbe number of the material of the positive lens Gp for a d-line.

Most commonly available optical materials of the negative lens Gn that satisfy conditional expressions (2) and (3) are high-dispersion materials.

Accordingly, for the negative lens Gn, first-order chromatic aberration of magnification is overcorrected. However, by using a material that satisfies conditional expression (4) for the positive lens Gp, the first-order chromatic aberration of magnification can be effectively and easily corrected.

At that time, it is more desirable that conditional expression (4) is changed to:

$$20.0 < vdp < 42.0 \quad (4a).$$

It is still more desirable that vdp is greater than 33.0 (37.0) and is less than 41.0.

If vdp exceeds the upper limit of conditional expression (4), first-order chromatic aberration of magnification occurs. Accordingly, the use of a plurality of positive lenses is disadvantageously required. In addition, if vdp falls below the lower limit of conditional expression (4a), a remaining amount of chromatic aberration is disadvantageously increased.

Furthermore, in the optical systems according to the embodiments of the present invention, it is more desirable that the positive lens Gp satisfies the following condition:

$$\theta gFp - (0.6438 - 0.001682 \times vdp) < 0 \quad (5)$$

where θgFp denotes the relative partial dispersion of the material of the positive lens Gp for the g-line and the F-line.

By satisfying the above-described conditions, the chromatic aberration of magnification in a short wavelength range can be efficiently and easily corrected.

At that time, it is desirable that conditional expression (5) is changed to:

$$-0.0500 < \theta gFp - (0.6438 - 0.001682 \times vdp) < 0.0020 \quad (5a)$$

In addition, it is desirable that the value defined by conditional expression (5) is less than −0.003 and is more desirable that the value defined by conditional expression (5) is greater than −0.01 (−0.005).

If the value defined by conditional expression (5) exceeds the upper limit, the second-order dispersion of the positive lens Gp is excessive. Accordingly, it is difficult to sufficiently correct the chromatic aberration of magnification in a short wavelength range. In contrast, if the value defined by conditional expression (5a) falls below the lower limit, the chromatic aberration of magnification is disadvantageously increased.

The optical systems LA shown in FIGS. 1, 3, and 5 according to first to third embodiments include a front lens unit LF having a negative refractive power, an aperture stop SP, and a rear lens unit LR having a positive refractive power arranged from the object side to an image side. In the optical systems LA, the negative lens Gn and the positive lens Gp are included in the front lens unit LF.

In contrast, the optical systems LA shown in FIGS. 7A, 7B, 10A and 10B according to fourth and fifth embodiments include a plurality of lens units including a first lens unit L1 having a negative refractive power. The first lens unit L1 is disposed furthest away on the enlargement conjugation side. At least two lens units of these lens units are moved. For these zoom lenses, it is desirable that the negative lens Gn and the positive lens Gp are included in the first lens unit L1.

Features of particular lens structures of the optical systems according to the embodiments of the present invention are described next.

First, the optical systems shown in FIGS. 1, 3, and 5 according to first to third embodiments, which are composed of a fixed focal length wide-angle lens, are described.

According to a first embodiment, the optical system includes, from the enlargement conjugation side to the reduction conjugation side, a negative meniscus lens G1 having a convex surface on the enlargement conjugation side, a negative meniscus lens G2 having a convex surface on the enlargement conjugation side and an aspherical surface on the reduction conjugation side, and a positive biconvex lens G3.

The negative lens G1 (the negative lens Gn) satisfies conditional expressions (1) and (2). Although the negative lens G1 has a super wide angle of view 2ω of 114.4°, the negative lens G1 has a shape that sufficiently reduces the lens open angle.

At that time, the surface of the negative lens G1 on the enlargement conjugation side has a high positive refractive power. Accordingly, by using a material that satisfies conditional expression (3), the chromatic aberration of magnification in a short wavelength range can be effectively corrected.

The surface of the negative lens G2 on the reduction conjugation side is aspherical, and the aspherical surface is disposed at a distance of 0.167 L from a surface located furthest away on the enlargement conjugation side of the entire lens system in the direction towards the reduction conjugation side, where L denotes the total lens length.

In this way, distortion can be effectively corrected at a position at which the incidence height of a pupil paraxial ray $\bar{h}$ is large.

A surface of the positive biconvex lens G3 (the positive lens Gp) on the enlargement conjugation side is disposed at a distance of 0.265 L from a surface located furthest away on the enlargement conjugation side of the lens system in the direction towards the reduction conjugation side. In addition, the positive lens G3 satisfies conditional expressions (4) and (5).

In this way, the first-order chromatic aberration of magnification that was overcorrected by the negative lens G1 is effectively generated at a position at which the incidence height of a principal ray is large, and the occurrence of chromatic aberration of magnification in a short wavelength range is reduced.

According to a second embodiment, the optical system includes, from the enlargement conjugation side to the reduction conjugation side, two negative meniscus lenses G1 and G2 having a convex surface on the enlargement conjugation side, a negative meniscus lens G3 having a convex surface on the enlargement conjugation side and an aspherical surface on the reduction conjugation side, and a cemented lens including a positive biconvex lens G4 and a negative biconcave lens G5.

The negative lens G1 (the negative lens Gn) satisfies conditional expressions (1) and (2). Although the negative lens G1 has a super wide angle of view 2ω of 125.8°, the negative lens G1 has a shape that sufficiently reduces the lens open angle.

In addition, like the first embodiment, by using a material that satisfies conditional expression (3) for the negative lens G1, the occurrence of chromatic aberration of magnification in a short wavelength range can be effectively corrected.

Furthermore, in the second embodiment, the angle of view is larger than that in the first embodiment. Accordingly, the negative lens G2 is additionally provided on the reduction conjugation side of the negative lens G1 so as to provide a predetermined amount of diverging (negative) power (refractive power) in addition to the power of the negative lens G1.

The surface of the negative lens G3 on the reduction conjugation side is aspherical, and the aspherical surface is disposed at a distance of 0.263 L from a surface located furthest away on the enlargement conjugation side of the entire lens system in the direction towards the reduction conjugation side.

In this way, the advantage the same as that of the negative lens G2 of the first embodiment can be provided.

A surface of the positive biconvex lens G4 (the positive lens Gp) on the enlargement conjugation side is disposed at a distance of 0.350 L from a surface located furthest away on the enlargement conjugation side of the lens system in the direction towards the reduction conjugation side. In addition, the positive lens G4 satisfies conditional expressions (4) and (5).

In this way, the advantage the same as that of the positive lens G3 of the first embodiment can be provided.

According to a third embodiment, the optical system includes, from the enlargement conjugation side to the reduction conjugation side, a negative meniscus lens G1 having a convex surface on the enlargement conjugation side, a negative meniscus lens G2 having a convex surface on the enlargement conjugation side and an aspherical surface on the reduction conjugation side, a biconvex lens G3, and a biconcave lens G4.

The negative lens G1 (the negative lens Gn) satisfies conditional expressions (1) and (2). Although the negative lens G1 has a super wide angle of view 2ω of 112.6°, the negative lens G1 has a shape that sufficiently reduces the lens open angle.

In addition, like the first embodiment, by using a material that satisfies conditional expression (3) for the negative lens G1, the occurrence of chromatic aberration of magnification in a short wavelength range can be corrected.

The surface of the negative lens G2 on the reduction conjugation side is aspherical, and the aspherical surface is disposed at a distance of 0.146 L from a surface located furthest away on the enlargement conjugation side of the lens system in the direction towards the reduction conjugation side. In this way, the advantage the same as that of the negative lens G2 of the first embodiment can be provided.

A surface of the positive biconvex lens G3 (the positive lens Gp) on the enlargement conjugation side is disposed at a distance of 0.244 L from a surface located furthest away on the enlargement conjugation side of the lens system in the direction towards the reduction conjugation side. In addition, the positive lens G3 satisfies conditional expression (4).

In this way, the first-order chromatic aberration of magnification that was overcorrected by the negative lens G1 is effectively generated by the positive lens G3, and the chromatic aberration of magnification is corrected in a balanced manner.

Second, the optical systems shown in FIGS. 7A, 7B, 10A, and 10B according to fourth and fifth embodiments, which are composed of a wide-angle zoom lens, are described.

According to the fourth and fifth embodiments, the wide-angle zoom lens is a negative-leading zoom lens including a first lens unit L1 disposed furthest away on the enlargement conjugation side. The first lens unit L1 has a negative power.

In general, positive-leading zoom lenses easily provide a high variable magnification function. However, in order to provide a wide angle of view, the effective diameter of a first lens unit is disadvantageously increased. Accordingly, positive-leading zoom lenses are not suitable for providing a wide-angle zoom lens having an angle of view 2ω of 80° or larger at a wide-angle end.

In order to provide a zoom lens having a wider angle of view, negative-leading zoom lenses having a lens unit with a negative power on the front side (the enlargement conjugation side) are suitable.

In such a case, when a single lens unit having a sufficiently low power (a lens unit having a focal length greater than or equal to 50 times the focal length at the wide-angle end) is disposed furthest away on the enlargement conjugation side, this lens unit has negligible effect on correction of the aberrations of the zoom lens system. Accordingly, when such a single lens unit having a sufficiently low power is located on the enlargement conjugation side, the presence of the lens unit is negligible, and therefore, a lens unit located so as to be closer to the reduction conjugation side than the lens unit having a sufficiently low power is regarded as a lens unit located furthest away on the enlargement conjugation side.

In the wide-angle zoom lens, the conditions satisfied by the wide-angle lens are also satisfied at least at the wide-angle end.

Particular lens structures of the zoom lenses according to the fourth and fifth embodiments of the present invention are described next.

According to a fourth embodiment, the optical system serves as a negative-leading zoom lens. The optical system includes, from the enlargement conjugation side to the reduction conjugation side, a first lens unit L1 having a negative refractive power, a second lens unit L2 having a positive refractive power, a third lens unit L3 having a positive refractive power, and a fourth lens unit L4 having a positive refractive power.

The first lens unit L1 includes a negative meniscus lens G1 having a convex surface on the enlargement conjugation side, a negative meniscus lens G2 having a convex surface on the enlargement conjugation side and an aspherical surface on the reduction conjugation side, and a positive biconvex lens G3.

The negative lens G1 (the negative lens Gn) satisfies conditional expressions (1) and (2). Although the negative lens G1 has a super wide angle of view 2ω of 115.6° at the wide-angle end, the negative lens G1 has a shape that sufficiently reduces the lens open angle.

In addition, like the first embodiment, by using a material that satisfies conditional expression (3) for the negative lens G1, the occurrence of chromatic aberration of magnification in a short wavelength range can be effectively corrected.

The surface of the negative lens G2 on the reduction conjugation side is aspherical, and the aspherical surface is disposed at a distance of 0.085 L from a surface located furthest away on the enlargement conjugation side of the lens system at the wide-angle end in the direction towards the reduction conjugation side. In this way, the advantage the same as that of the negative lens G2 of the first embodiment can be provided.

A surface of the positive biconvex lens G3 (the positive lens Gp) on the enlargement conjugation side is disposed at a distance of 0.152 L from a surface located furthest away on the enlargement conjugation side of the lens system at the wide angle end in the direction towards the reduction conjugation side. In addition, the positive lens G3 satisfies conditional expressions (4) and (5).

In this way, the advantage the same as that of the positive lens G3 of the first embodiment can be provided.

According to a fifth embodiment, the optical system serves as a negative-leading zoom lens. The optical system includes, from the enlargement conjugation side to the reduction conjugation side, a first lens unit L1 having a negative refractive power, a second lens unit L2 having a positive refractive power, a third lens unit L3 having a positive refractive power, and a fourth lens unit L4 having a positive refractive power.

The first lens unit L1 includes a negative meniscus lens G1 having a convex surface on the enlargement conjugation side, a negative meniscus lens G2 having a convex surface on the enlargement conjugation side and an aspherical surface on the reduction conjugation side, and a positive biconvex lens G3.

The negative lens G1 (the negative lens Gn) satisfies conditional expressions (1) and (2). Although the negative lens G1 has a super wide angle of view 2ω of 112.6° at the wide-angle end, the negative lens G1 has a shape that sufficiently reduces the lens open angle.

In addition, like the first embodiment, by using a material that satisfies conditional expression (3) for the negative lens G1, the occurrence of chromatic aberration of magnification in a short wavelength range can be effectively corrected.

The surface of the negative lens G2 on the reduction conjugation side is aspherical, and the aspherical surface is disposed at a distance of 0.091 L from a surface located furthest away on the enlargement conjugation side of the lens system at the wide-angle end in the direction towards the reduction conjugation side. In this way, the advantage the same as that of the negative lens G2 of the first embodiment can be provided.

A surface of the biconvex positive lens G3 (the positive lens Gp) on the enlargement conjugation side is disposed at a distance of 0.148 L from a surface located furthest away on the enlargement conjugation side of the lens system at the wide angle end in the direction towards the reduction conjugation side. In addition, the positive lens G3 satisfies conditional expressions (4) and (5). In this way, the advantage the same as that of the positive lens G3 of the first embodiment can be provided.

While the exemplary embodiments of the present invention have been described with reference to the wide-angle lenses and wide-angle zoom lenses, the optical systems according to the present invention are not limited thereto. Nevertheless, it will be understood that various modifications may be made without departing from the spirit and scope of the invention.

An embodiment of a digital still camera using one of the optical systems according to the above-described embodiments for an imaging optical system is described next with reference to FIG. 13.

As shown in FIG. 13, a camera body 20 includes an image capturing optical system 21 according to any one of the above-described first to fifth embodiments. The camera body 20 further includes a solid-state image pickup element 22 (a photoelectric conversion element), such as a CCD sensor or a CMOS sensor. The solid-state image pickup element 22 receives an object image formed by the image capturing optical system 21.

The camera body 20 further includes a memory 23 and a viewfinder 24. The memory 23 stores information corresponding to the object image photoelectrically converted by the solid-state image pickup element 22. The viewfinder 24 is formed from, for example, a liquid crystal display panel. The viewfinder 24 is used for monitoring the object image formed on the solid-state image pickup element 22.

In this way, by applying the optical system according to the present invention to a digital still camera, a compact and high-performance optical apparatus can be achieved.

In addition, the optical system according to the present invention can be used for a projection lens of an image projection apparatus (a projector).

First to fifth numerical embodiments illustrate the lens data of the wide-angle lenses according to the first to third embodiments and the lens data of the wide-angle zoom lenses according to the fourth and fifth embodiments.

In these numerical embodiments, the order of each surface from the enlargement conjugation side, the radius of curvature of each optical surface, a distance d between the optical surfaces, the index of refraction nd and Abbe number vd of each optical member for the d-line, and a refractive partial dispersion X of each optical member for the g-line and the F-line are shown.

Note that, in the numerical embodiments, X=θgF−(0.6438−0.001682×vd). In addition, an optical surface indicated by "*" is an aspherical surface.

For aspherical surfaces, a surface position Sag(R) in an optical axis direction at a distance R from the optical axis in a direction perpendicular to the optical axis is expressed as follows:

$$\mathrm{Sag}(R) = \frac{\left(\frac{1}{r}\right) \times R^2}{1 + \sqrt{1 - (1+K) \times \left(\frac{1}{r}\right)^2 \times R^2}} + A4 \times R^4 + A6 \times R^6 + A8 \times R^8 + A10 \times R^{10}$$

The aspherical coefficients of each aspherical surface are shown in each table. In the aspherical coefficients, "E-N" means "$\times 10^{-N}$". In addition, "f" denotes the focal length. "FNO" denotes the F number. "ω" denotes the half angle of view. "Y'" denotes the image height. "L" denotes the length between a start surface (a first lens surface) and a final lens surface. "BF" denotes the length between the final surface of the optical system and an image plane.

For the zoom lenses according to the fourth and fifth embodiments, the values obtained at three zoom positions: wide-angle end, a position in a middle range, and a telephoto end are shown.

In addition, a distance d between optical surfaces marked with a note "variable" indicates that the distance varies in accordance with a zooming operation (a variable magnification operation). Distances d between the surfaces at wide-angle end, a position in a middle range, and a telephoto end are shown in the additional tables.

Furthermore, Table 1 shows the computation results of the above-described conditional expressions based on the following lens data according to the first to fifth numerical embodiments.

| | First Numerical Embodiment | | | | |
|---|---|---|---|---|---|
| | Surface Data | | | | |
| Surface No. | r | d | nd | vd | X |
| 1 | 50.3471 | 3.50 | 1.80518 | 25.4 | 0.0151 |
| 2 | 29.3671 | 8.54 | | | |
| 3 | 51.3387 | 3.50 | 1.58312 | 59.4 | −0.0016 |
| 4* | 16.0862 | 9.14 | | | |
| 5 | 60.7996 | 6.27 | 1.65411 | 39.7 | −0.0034 |
| 6 | −157.9678 | 1.24 | | | |
| 7 | −111.3574 | 2.00 | 1.60311 | 60.6 | −0.0003 |
| 8 | 17.1852 | 6.91 | | | |
| 9 | −80.2956 | 2.00 | 1.60311 | 60.6 | −0.0003 |
| 10 | 17.4553 | 7.20 | 1.65411 | 39.7 | −0.0034 |
| 11 | −130.8727 | 0.15 | | | |
| 12 | 41.4919 | 3.51 | 1.69894 | 30.1 | 0.0099 |
| 13 | −427.9398 | 6.44 | | | |
| 14 | 26.4145 | 2.46 | 1.58267 | 46.4 | 0.0014 |
| 15 | 9153.9089 | 3.18 | | | |
| 16 (Aperture) | | 1.34 | | | |
| 17 | −72.7688 | 1.00 | 1.83480 | 42.7 | −0.0078 |
| 18 | 32.6144 | 0.15 | | | |
| 19 | 16.2812 | 3.39 | 1.59270 | 35.3 | 0.0089 |
| 20 | −47.1917 | 0.15 | | | |
| 21 | 338.4792 | 1.00 | 1.83400 | 37.2 | −0.0037 |
| 22 | 10.4916 | 5.16 | 1.49700 | 81.5 | 0.0309 |
| 23 | −15.6629 | 1.61 | | | |
| 24 | −10.4890 | 1.20 | 1.83400 | 37.2 | −0.0037 |
| 25 | −88.1324 | 0.15 | | | |
| 26 | 78.3131 | 7.18 | 1.49700 | 81.5 | 0.0309 |
| 27 | −13.9705 | 0.15 | | | |
| 28 | −69.8214 | 4.50 | 1.58312 | 59.4 | −0.0016 |
| 29* | −23.1579 | | | | |

-continued

Aspherical Surface Data

| Surface No. | K | A4 | A6 | A8 | A10 |
|---|---|---|---|---|---|
| 4 | −8.31168E−01 | −5.87680E−06 | −2.09911E−09 | −2.83619E−11 | 1.58639E−14 |
| 29 | 0.00000E+00 | 2.12768E−05 | −1.43503E−08 | 4.82905E−10 | −5.43468E−13 |

Various Data

| | |
|---|---|
| f | 14.20 |
| FNO | 2.90 |
| Angle of View ω | 57.20 |
| Image Height Y' | 21.64 |
| Total Length L | 93.00 |
| BF | 40.30 |

Second Numerical Embodiment

Surface Data

| Surface No. | r | d | nd | νd | X |
|---|---|---|---|---|---|
| 1 | 55.4116 | 4.50 | 1.78472 | 25.7 | 0.0155 |
| 2 | 34.9965 | 8.63 | | | |
| 3 | 46.3673 | 4.00 | 1.74949 | 35.3 | 0.0024 |
| 4 | 26.2458 | 10.13 | | | |
| 5 | 44.5170 | 3.50 | 1.58312 | 59.4 | −0.0016 |
| 6* | 16.1517 | 10.09 | | | |
| 7 | 109.1269 | 9.12 | 1.65411 | 39.7 | −0.0034 |
| 8 | −35.8060 | 2.80 | 1.49700 | 81.5 | 0.0309 |
| 9 | 22.4950 | 6.88 | | | |
| 10 | 24.0261 | 6.99 | 1.65411 | 39.7 | −0.0034 |
| 11 | −37.8370 | 1.80 | 1.60311 | 60.6 | −0.0003 |
| 12 | 14.9686 | 1.88 | | | |
| 13 | 23.1685 | 4.84 | 1.62588 | 35.7 | 0.0055 |
| 14 | −56.8406 | 0.63 | | | |
| 15 | −28.8248 | 1.20 | 1.83400 | 37.2 | −0.0037 |
| 16 | 1501.6599 | 0.20 | | | |
| 17 | 33.9320 | 3.77 | 1.51742 | 52.4 | 0.0008 |
| 18 | −24.8489 | 2.88 | | | |
| 19 (Aperture) | | 2.07 | | | |
| 20 | −50.9991 | 1.00 | 1.83400 | 37.2 | −0.0037 |
| 21 | 33.8538 | 0.15 | | | |
| 22 | 17.6293 | 2.91 | 1.59270 | 35.3 | 0.0089 |
| 23 | −92.1092 | 0.20 | | | |
| 24 | 35.1209 | 1.00 | 1.83400 | 37.2 | −0.0037 |
| 25 | 11.0695 | 5.79 | 1.49700 | 81.5 | 0.0309 |
| 26 | −25.4903 | 4.43 | | | |
| 27 | −14.9581 | 1.20 | 1.83400 | 37.2 | −0.0037 |
| 28 | −119.6868 | 0.15 | | | |
| 29 | 145.0957 | 8.92 | 1.49700 | 81.5 | 0.0309 |
| 30 | −17.5215 | 0.15 | | | |
| 31 | −56.4604 | 5.00 | 1.58312 | 59.4 | −0.0016 |
| 32* | −27.6583 | | | | |

Aspherical Surface Data

| Surface No. | K | A4 | A6 | A8 | A10 |
|---|---|---|---|---|---|
| 6 | −1.03337E+00 | −3.01610E−06 | −1.75946E−10 | 2.83614E−12 | −2.07198E−14 |
| 32 | 0.00000E+00 | 1.37800E−05 | 1.89914E−08 | −3.65199E−12 | 3.56919E−14 |

Various Data

| | |
|---|---|
| f | 17.20 |
| FNO | 4.02 |
| Angle of View ω | 62.90 |
| Image Height Y' | 32.64 |
| Total Length L | 116.82 |
| BF | 50.00 |

-continued

Third Numerical Embodiment

Surface Data

| Surface No. | r | d | nd | vd | X |
|---|---|---|---|---|---|
| 1 | 56.0640 | 3.20 | 1.80518 | 25.4 | 0.0151 |
| 2 | 29.0913 | 5.70 | | | |
| 3 | 49.0660 | 3.50 | 1.58313 | 59.4 | 0.0024 |
| 4* | 16.9033 | 8.38 | | | |
| 5 | 68.0600 | 5.83 | 1.60342 | 38.0 | 0.0036 |
| 6 | −85.1111 | 0.20 | | | |
| 7 | −143.0751 | 1.80 | 1.49700 | 81.5 | 0.0309 |
| 8 | 14.6351 | 4.82 | | | |
| 9 | 103.3094 | 4.24 | 1.69895 | 30.1 | 0.0099 |
| 10 | −59.1749 | 1.29 | | | |
| 11 | −24.1421 | 1.20 | 1.60311 | 60.6 | −0.0003 |
| 12 | −265.1757 | 0.20 | | | |
| 13 | 34.6845 | 9.83 | 1.62588 | 35.7 | 0.0055 |
| 14 | −33.5764 | 4.43 | | | |
| 15 (Aperture) | | 2.19 | | | |
| 16 | −38.7928 | 1.00 | 1.83481 | 42.7 | −0.0078 |
| 17 | 52.2167 | 0.20 | | | |
| 18 | 18.2633 | 2.82 | 1.59270 | 35.3 | 0.0089 |
| 19 | −70.9081 | 0.20 | | | |
| 20 | 34.9432 | 1.00 | 1.83400 | 37.2 | −0.0037 |
| 21 | 11.3993 | 5.95 | 1.49700 | 81.5 | 0.0309 |
| 22 | −19.1964 | 1.97 | | | |
| 23 | −13.1581 | 1.20 | 1.83400 | 37.2 | −0.0037 |
| 24 | −164.6546 | 0.15 | | | |
| 25 | 105.7267 | 8.63 | 1.49700 | 81.5 | 0.0309 |
| 26 | −16.9574 | 0.15 | | | |
| 27 | −61.8572 | 5.00 | 1.58313 | 59.4 | −0.0016 |
| 28* | −26.8314 | | | | |

Aspherical Surface Data

| Surface No. | K | A4 | A6 | A8 | A10 |
|---|---|---|---|---|---|
| 6 | −4.90520E−01 | −1.98717E−05 | −5.91439E−09 | −3.86113E−11 | 1.98139E−14 |
| 32 | 0.00000E+00 | 1.45989E−05 | 2.11620E−08 | 3.28508E−11 | 3.79819E−14 |

Various Data

| | |
|---|---|
| f | 20.00 |
| FNO | 4.03 |
| Angle of View ω | 56.30 |
| Image Height Y' | 29.20 |
| Total Length L | 85.07 |
| BF | 52.71 |

Fourth Numerical Embodiment

Surface Data

| Surface No. | r | d | nd | vd | X |
|---|---|---|---|---|---|
| 1 | 55.3327 | 3.20 | 1.80518 | 25.4 | 0.0151 |
| 2 | 27.0408 | 5.40 | | | |
| 3 | 40.9874 | 3.50 | 1.58313 | 59.4 | −0.0016 |
| 4* | 15.6816 | 9.23 | | | |
| 5 | 98.3656 | 7.00 | 1.65412 | 39.7 | −0.0034 |
| 6 | −39.4491 | 1.80 | 1.60311 | 60.6 | −0.0003 |
| 7 | 20.2006 | (variable) | | | |
| 8 | −107.3100 | 3.05 | 1.72825 | 28.5 | 0.0118 |
| 9 | −27.3445 | 1.14 | | | |
| 10 | −19.6593 | 1.20 | 1.60311 | 60.6 | −0.0003 |
| 11 | −56.9082 | 0.20 | | | |
| 12 | 63.4597 | 4.20 | 1.51742 | 52.4 | 0.0008 |
| 13 | −26.5055 | (variable) | | | |
| 14 (Aperture) | | 4.16 | | | |
| 15 | −51.7739 | 1.00 | 1.83481 | 42.7 | −0.0078 |
| 16 | 34.0735 | 0.20 | | | |
| 17 | 21.0750 | 2.69 | 1.59270 | 35.3 | 0.0089 |
| 18 | −71.2566 | 0.20 | | | |
| 19 | 25.0467 | 1.00 | 1.83400 | 37.2 | −0.0037 |
| 20 | 12.3888 | 6.43 | 1.49700 | 81.5 | 0.0309 |
| 21 | −27.1084 | (variable) | | | |
| 22 | −16.7857 | 1.20 | 1.83400 | 37.2 | −0.0037 |

-continued

| | | | | | |
|---|---|---|---|---|---|
| 23 | 416.0442 | 0.15 | | | |
| 24 | 51.7229 | 8.40 | 1.49700 | 81.5 | 0.0309 |
| 25 | −19.4338 | 0.15 | | | |
| 26 | −125.9912 | 5.00 | 1.58313 | 59.4 | −0.0016 |
| 27* | −29.9698 | | | | |

Aspherical Surface Data

| Surface No. | K | A4 | A6 | A8 | A10 |
|---|---|---|---|---|---|
| 4 | −7.21435E−01 | −7.44819E−06 | 5.03521E−09 | 2.13935E−11 | −1.27243E−13 |
| 27 | 0.00000E+00 | 1.84594E−05 | 1.28856E−08 | 6.33452E−11 | 1.20449E−13 |

Various Data
Zoom Ratio 1.29

| | | | |
|---|---|---|---|
| f | 14.00 | 16.00 | 18.00 |
| FNO | 4.06 | 4.41 | 4.68 |
| Angle of View ω | 57.80 | 53.40 | 49.60 |
| Image Height Y' | 21.64 | 21.64 | 21.64 |
| Total Length L | 99.70 | 99.77 | 97.27 |
| BF | 40.30 | 40.03 | 42.58 |
| d7 | 11.87 | 8.60 | 5.65 |
| d13 | 15.33 | 13.58 | 11.26 |
| d21 | 2.01 | 7.11 | 9.87 |

Zoom Unit Data

| Unit | Start Surface | f |
|---|---|---|
| 1 | 1 | −13.54 |
| 2 | 8 | 36.36 |
| 3 | 14 | 46.18 |
| 4 | 22 | 93.62 |

Fifth Numerical Embodiment

Surface Data

| Surface No. | r | d | nd | νd | X |
|---|---|---|---|---|---|
| 1 | 57.6833 | 3.20 | 1.80518 | 25.4 | 0.0151 |
| 2 | 29.1332 | 6.90 | | | |
| 3 | 50.8769 | 3.50 | 1.58313 | 59.4 | −0.0016 |
| 4* | 17.1175 | 8.61 | | | |
| 5 | 72.9282 | 7.70 | 1.65412 | 39.7 | −0.0034 |
| 6 | −49.4821 | 1.80 | 1.49700 | 81.5 | 0.0309 |
| 7 | 20.1956 | (variable) | | | |
| 8 | 74.2238 | 3.86 | 1.78472 | 25.7 | 0.0155 |
| 9 | −521.0662 | 3.82 | | | |
| 10 | −26.1461 | 1.20 | 1.60311 | 60.6 | −0.0003 |
| 11 | 2638.6837 | 0.20 | | | |
| 12 | 29.2148 | 5.74 | 1.56732 | 42.8 | 0.0013 |
| 13 | −36.5491 | (variable) | | | |
| 14 (Aperture) | | 6.86 | | | |
| 15 | −17.2845 | 1.00 | 1.83481 | 42.7 | −0.0078 |
| 16 | −31.9588 | 0.20 | | | |
| 17 | 22.8816 | 3.15 | 1.59270 | 35.3 | 0.0089 |
| 18 | −57.0853 | 0.20 | | | |
| 19 | 99.1739 | 1.00 | 1.83400 | 37.2 | −0.0037 |
| 20 | 14.5360 | 7.20 | 1.49700 | 81.5 | 0.0309 |
| 21 | −22.5145 | (variable) | | | |
| 22 | −15.4333 | 1.20 | 1.83400 | 37.2 | −0.0037 |
| 23 | −113.4826 | 0.15 | | | |
| 24 | 110.4077 | 8.73 | 1.49700 | 81.5 | 0.0309 |
| 25 | −21.2249 | 0.15 | | | |
| 26 | −145.8334 | 5.00 | 1.58313 | 59.4 | −0.0016 |
| 27* | −36.6383 | | | | |

Aspherical Surface Data

| Surface No. | K | A4 | A6 | A8 | A10 |
|---|---|---|---|---|---|
| 4 | −5.84245E−01 | −1.23090E−05 | −6.36112E−09 | −4.67542E−12 | −1.93272E−14 |
| 27 | 0.00000E+00 | 1.30782E−05 | 7.28518E−09 | 3.33464E−11 | −4.36057E−14 |

-continued

| | Various Data Zoom Ratio 1.2 | | |
|---|---|---|---|
| f | 20.00 | 22.00 | 24.00 |
| FNO | 4.03 | 4.23 | 4.43 |
| Angle of View ω | 56.30 | 53.70 | 51.30 |
| Image Height Y' | 29.20 | 29.20 | 29.20 |
| Total Length L | 97.30 | 93.95 | 90.71 |
| BF | 52.70 | 56.00 | 59.25 |
| d7 | 8.29 | 5.38 | 3.12 |
| d13 | 6.86 | 5.67 | 4.05 |
| d21 | 2.25 | 2.99 | 3.64 |

| | Zoom Unit Data | |
|---|---|---|
| Unit | Start Surface | f |
| 1 | 1 | −17.40 |
| 2 | 8 | 44.03 |
| 3 | 15 | 43.24 |
| 4 | 22 | 219.61 |

*Here, $X = \theta gF - (0.6438 - 0.001682 \times vd)$

TABLE 1

| | First Embodiment | Second Embodiment | Third Embodiment |
|---|---|---|---|
| Lens Unit Structure | — | — | — |
| Lens Structure from Enlargement Conjugation Side | Negative meniscus lens G1 with convex surface on enlargement side | Negative meniscus lens G1 with convex surface on enlargement side Negative meniscus lens G2 with convex surface on enlargement side | Negative meniscus lens G1 with convex surface on enlargement side |
| | Negative meniscus G2 (i) with convex surface on enlargement side and aspherical surface on reduction side Biconvex lens G3 (ii) | Negative meniscus G3 (i) with convex surface on enlargement side and aspherical surface on reduction side Biconvex Lens G4 (ii) | Negative meniscus G2 (i) with convex surface on enlargement side and aspherical surface on reduction side Biconvex lens G3 (ii) |
| Half Angle of View ω (degree) | 57.2 | 62.9 | 56.3 |
| Lens Open Angle θ (degree) | 60.69 | 66.72 | 51.64 |
| Aspherical surface position (i) | 0.167 L | 0.263 L | 0.146 L |
| Position of convex lens (ii) | 0.265 L | 0.350 L | 0.244 L |
| (1) | 1.15 | 1.19 | 0.84 |
| (2) | 1.80518 | 1.78472 | 1.80518 |
| (3) | 0.0151 | 0.0155 | 0.0151 |
| (4) | 39.7 | 39.7 | 38.0 |
| (5) | −0.0034 | −0.0034 | 0.0036 |

| | Fourth Embodiment | Fifth Embodiment |
|---|---|---|
| Lens Unit Structure | Negative-Positive-Positive-Positive Refractive Power | Negative-Positive-Positive-Positive Refractive Power |
| Lens Structure from Enlargement Conjugation Side | Negative meniscus lens G1 with convex surface on enlargement side Negative | Negative meniscus lens G1 with convex surface on enlargement side Negative |

TABLE 1-continued

|  | meniscus G2 (i) with convex surface on enlargement side and aspherical surface on reduction side Biconvex lens G3 (ii) | meniscus G2 (i) with convex surface on enlargement side and aspherical surface on reduction side Biconvex lens G3 (ii) |
|---|---|---|
| Half Angle of View ω (degree) | 57.8 | 56.3 |
| Lens Open Angle θ (degree) | 55.30 | 55.52 |
| Position of Aspherical Surface (i) | 0.085 Lw | 0.091 Lw |
| Position of Convex lens (ii) | 0.152 Lw | 0.148 Lw |
| (1) | 0.91 | 0.97 |
| (2) | 1.80518 | 1.80518 |
| (3) | 0.0151 | 0.0151 |
| (4) | 39.7 | 39.7 |
| (5) | −0.0034 | −0.0034 |

According to the embodiments of the present invention, an optical system having a wide angle of view 2ω of 80° and greater that can sufficiently correct distortion and chromatic aberration of magnification in the visible light range and that can sufficiently reduce the open angle of a surface of a negative lens on the reduction conjugation side disposed furthest away on the enlargement conjugation side disposed furthest away on the enlargement conjugation side can be provided. In addition, an image pickup apparatus including such an optical system can be provided.

Furthermore, the embodiments of the present invention can be applied to an optical system for an image projection apparatus, such as a liquid crystal projector, and an image projection apparatus in addition to an optical system of an image pickup apparatus. An image pickup apparatus according to the present invention includes an image forming element (a light modulation element), such as a liquid crystal panel or a micromirror device in place of the above-described image pickup element. Therefore, according to the embodiments of the present invention, the image projection apparatus includes the image forming element and the optical system (the optical system according to one of the above-described first to fifth embodiments) that projects image light from the image forming element to a projection surface, such as a screen.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-030299 filed Feb. 12, 2008, which is hereby incorporated by reference herein in its entirety.

What is claimed is:

1. An optical system mountable to an image pickup apparatus including an image pickup element, comprising:
    a negative lens disposed furthest away on an enlargement conjugation side,
    wherein the following condition is satisfied:

80 degrees<2ω, where 2ω (degrees) denotes an angle of view of the optical system, and wherein the following conditions are satisfied:

$0.25 < \tan\theta/\tan\omega < 1.5$, $Ndn > 1.65$, and $\theta gFn - (0.6438 - 0.001682 \times vdn) > 0.0010$, where θ denotes a lens open angle of a surface of the negative lens on a reduction conjugation side, Ndn and vdn denote the index of refraction and Abbe number of a material of the negative lens for a d-line, respectively, and θgFn denotes a relative partial dispersion of the material of the negative lens for a g-line and an F-line.

2. The optical system according to claim 1, further comprising:
    at least one aspherical surface,
    wherein a distance between the at least one aspherical surface and a surface located furthest away on the enlargement conjugation side among surfaces of the optical system is less than or equal to 0.3 L, where L denotes a total length of the optical system.

3. The optical system according to claim 1, further comprising:
    a positive lens,
    wherein a distance between a surface of the positive lens on the enlargement conjugation side and a surface located furthest away on the enlargement conjugation side among surfaces of the optical system is less than or equal to 0.4 L, where L denotes a total length of the optical system, and wherein the following condition is satisfied:

$vdp < 45$, where vdp denotes an Abbe number of a material of the positive lens for the d-line.

4. The optical system according to claim 3, wherein the following condition is satisfied:

$\theta gFp - (0.6438 - 0.001682 \times vdp) < 0$, where θgFp denotes a relative partial dispersion of the material of the positive lens for the g-line and the F-line.

5. The optical system according to claim 3, further comprising, in order from an object side to an image side:
    a front unit having a negative refractive power;

an aperture stop; and a rear unit having a positive refractive power, wherein the negative lens and the positive lens are included in the front unit.

6. The optical system according to claim 3, wherein the optical system serves as a zoom lens including a plurality of lens units, the lens units include a first lens unit disposed furthest away on the enlargement conjugation side, and the first lens unit has a negative refractive power, and wherein at least two lens units of the lens units are moved during zooming.

7. The optical system according to claim 6, wherein the negative lens and the positive lens are included in the first lens unit.

8. The optical system according to claim 6, further comprising, in order from the enlargement conjugation side to the reduction conjugation side:
- a second lens unit disposed on the reduction conjugation side of the first lens unit, the second lens unit having a positive refractive power;
- a third lens unit having a positive refractive power; and
- a fourth lens unit having a positive refractive power,
- wherein the second, third, and fourth lens units are moved during zooming.

9. An image pickup apparatus comprising:
- an image pickup element; and
- an optical system that directs light output from an object onto the image pickup element, the optical system including a negative lens at a position closest to the object,
- wherein the following condition is satisfied:

$$80 \text{ degrees} < 2\omega,$$

where $2\omega$ (degrees) denotes an angle of view of the optical system, and wherein the following conditions are satisfied:

$$0.25 < \tan\theta/\tan\omega < 1.5,$$

$$Ndn > 1.65, \text{ and}$$

$$\theta gFn - (0.6438 - 0.001682 \times vdn) > 0.0010,$$

where $\theta$ denotes a lens open angle of a surface of the negative lens on an image pickup element side, Ndn and vdn denote the index of refraction and Abbe number of a material of the negative lens for a d-line, respectively, and $\theta gFn$ denotes a relative partial dispersion of the material of the negative lens for a g-line and an F-line.

10. An optical system comprising:
- a negative lens disposed furthest away on an enlargement conjugation side,
- wherein the following condition is satisfied:

$$80 \text{ degrees} < 2\omega,$$

where $2\omega$ (degrees) denotes an angle of view of the optical system, and wherein the following conditions are satisfied:

$$0.25 < \tan\theta/\tan\omega < 1.5,$$

$$Ndn > 1.65, \text{ and}$$

$$\theta gFn - (0.6438 - 0.001682 \times vdn) > 0.0010,$$

where $\theta$ denotes a lens open angle of a surface of the negative lens on a reduction conjugation side, Ndn and vdn denote the index of refraction and Abbe number of a material of the negative lens for a d-line, respectively, and $\theta gFn$ denotes a relative partial dispersion of the material of the negative lens for a g-line and an F-line.

11. An optical apparatus comprising:
- an optical system including a negative lens disposed furthest away on an enlargement conjugation side,
- wherein the following condition is satisfied:

$$80 \text{ degrees} < 2\omega,$$

where $2\omega$ (degrees) denotes an angle of view of the optical system, and wherein the following conditions are satisfied:

$$0.25 < \tan\theta/\tan\omega < 1.5,$$

$$Ndn > 1.65, \text{ and}$$

$$\theta gFn - (0.6438 - 0.001682 \times vdn) > 0.0010,$$

where $\theta$ denotes a lens open angle of a surface of the negative lens on a reduction conjugation side, Ndn and vdn denote the index of refraction and Abbe number of a material of the negative lens for a d-line, respectively, and $\theta gFn$ denotes a relative partial dispersion of the material of the negative lens for a g-line and an F-line.

12. An optical system mountable to an image projection apparatus including an image forming element, comprising:
- a negative lens disposed furthest away on an enlargement conjugation side,
- wherein the following condition is satisfied:

$$80 \text{ degrees} < 2\omega,$$

where $2\omega$ (degrees) denotes an angle of view of the optical system, and wherein the following conditions are satisfied:

$$0.25 < \tan\theta/\tan\omega < 1.5,$$

$$Ndn > 1.65, \text{ and}$$

$$\theta gFn - (0.6438 - 0.001682 \times vdn) > 0.0010,$$

where $\theta$ denotes a lens open angle of a surface of the negative lens on a reduction conjugation side, Ndn and vdn denote the index of refraction and Abbe number of a material of the negative lens for a d-line, respectively, and $\theta gFn$ denotes a relative partial dispersion of the material of the negative lens for a g-line and an F-line.

13. An image projection apparatus comprising:
- an image forming element; and
- an optical system configured to project a light ray output from the image forming element, the optical system including a negative lens disposed furthest away on an enlargement conjugation side,
- wherein the following condition is satisfied:

$$80 \text{ degrees} < 2\omega,$$

where $2\omega$ (degrees) denotes an angle of view of the optical system, and wherein the following conditions are satisfied:

$$0.25 < \tan\theta/\tan\omega < 1.5,$$

$$Ndn > 1.65, \text{ and}$$

$$\theta gFn - (0.6438 - 0.001682 \times vdn) > 0.0010,$$

where $\theta$ denotes a lens open angle of a surface of the negative lens on a reduction conjugation side, Ndn and vdn denote the index of refraction and Abbe number of a material of the negative lens for a d-line, respectively, and $\theta gFn$ denotes a relative partial dispersion of the material of the negative lens for a g-line and an F-line.

* * * * *